United States Patent
Wang et al.

(10) Patent No.: US 10,713,134 B2
(45) Date of Patent: Jul. 14, 2020

(54) DISTRIBUTED STORAGE AND REPLICATION SYSTEM AND METHOD

(71) Applicant: HUAWEI TECHNOLOGIES CO., LTD., Shenzhen, Guangdong (CN)

(72) Inventors: Daohui Wang, Shenzhen (CN); Feng Zhang, Shenzhen (CN); Xuyou Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/589,856

(22) Filed: May 8, 2017

(65) Prior Publication Data
US 2017/0242767 A1 Aug. 24, 2017

Related U.S. Application Data

(63) Continuation of application No. PCT/CN2014/090445, filed on Nov. 6, 2014.

(51) Int. Cl.
*G06F 11/20* (2006.01)
*G06F 16/27* (2019.01)
(Continued)

(52) U.S. Cl.
CPC .......... *G06F 11/2064* (2013.01); *G06F 9/466* (2013.01); *G06F 9/5077* (2013.01);
(Continued)

(58) Field of Classification Search
CPC ............. G06F 17/30578; G06F 9/5077; G06F 11/2064; G06F 12/02; G06F 9/466;
(Continued)

(56) References Cited

U.S. PATENT DOCUMENTS 5,790,788 A * 8/1998 Badovinatz ............. H04L 29/06
709/201
6,065,065 A * 5/2000 Murakami ........ G06F 17/30067
707/E17.01
(Continued)

FOREIGN PATENT DOCUMENTS

CN           1474275 A      2/2004
CN         101751284 A      6/2010
(Continued)

OTHER PUBLICATIONS

Philip A. Bernstein et al., "Adapting Microsoft SQL Server for Cloud Computing", Data Engineering (ICDE), 2011 IEEE 27th International Conference, Apr. 11, 2011, XP031868529, 9 pages.

*Primary Examiner* — Alexander Khong
*Assistant Examiner* — Hubert Cheung
(74) *Attorney, Agent, or Firm* — Leydig, Voit & Mayer, Ltd.

(57) ABSTRACT

A distributed storage and replication system includes a MDC module, multiple IO routing modules, and multiple OSD nodes. The MDC module is adapted to configure at least two partition, the IO routing module is adapted to route an IO request to an OSD node, and the OSD node is adapted to execute storage of data corresponding to the IO request. The MDC is configured to determine a faulty OSD node, update a partition view of a partition group that includes a partition on the faulty OSD node, and send an updating notification to a primary OSD node in the updated partition view. The primary OSD node is adapted to process replication of the data corresponding to the IO request. According to embodiments of the present disclosure, processing performance, fault tolerance, and availability of consistency replication are improved.

12 Claims, 20 Drawing Sheets

(51) Int. Cl.
*G06F 12/02* (2006.01)
*G06F 9/50* (2006.01)
*G06F 9/46* (2006.01)
*G06F 11/07* (2006.01)

(52) U.S. Cl.
CPC ...... *G06F 11/2028* (2013.01); *G06F 11/2041* (2013.01); *G06F 11/2048* (2013.01); *G06F 11/2094* (2013.01); *G06F 12/02* (2013.01); *G06F 16/273* (2019.01); *G06F 11/0709* (2013.01); *G06F 11/0757* (2013.01)

(58) Field of Classification Search
CPC ............... G06F 16/273; G06F 11/2048; G06F 11/2028; G06F 11/2094; G06F 11/2041; G06F 11/0709; G06F 11/0757
See application file for complete search history.

(56) References Cited

U.S. PATENT DOCUMENTS

| | | | |
|---|---|---|---|
| 6,308,300 B1 * | 10/2001 | Bushnell | G01R 31/316 324/537 |
| 8,644,188 B1 * | 2/2014 | Brandwine | H04L 12/4666 370/254 |
| 8,713,282 B1 * | 4/2014 | Rajimwale | G06F 3/0644 711/173 |
| 2006/0182050 A1 | 8/2006 | Dohm | |
| 2011/0099420 A1 * | 4/2011 | MacDonald McAlister | G06F 11/2025 714/6.32 |
| 2011/0106757 A1 | 5/2011 | Pickney et al. | |
| 2011/0167113 A1 * | 7/2011 | Feng | G06F 3/061 709/203 |
| 2011/0313973 A1 | 12/2011 | Srivas et al. | |
| 2012/0131272 A1 | 5/2012 | Suzuki et al. | |
| 2012/0166390 A1 | 6/2012 | Merriman et al. | |
| 2012/0179798 A1 | 7/2012 | Pafumi et al. | |
| 2012/0246517 A1 | 9/2012 | Bender et al. | |
| 2013/0029024 A1 | 1/2013 | Warren | |
| 2013/0290249 A1 | 10/2013 | Merriman et al. | |
| 2014/0032496 A1 | 1/2014 | Urano | |
| 2014/0136800 A1 | 5/2014 | Birkestrand et al. | |
| 2014/0351636 A1 * | 11/2014 | Yin | G06F 11/1662 714/15 |
| 2015/0143376 A1 * | 5/2015 | Ruggiero | G06F 9/466 718/101 |
| 2015/0378775 A1 * | 12/2015 | Vermeulen | G06F 9/466 707/692 |

FOREIGN PATENT DOCUMENTS

| | | |
|---|---|---|
| CN | 102025550 A | 4/2011 |
| CN | 102355369 A | 2/2012 |
| CN | 102571452 A | 7/2012 |
| CN | 102724057 A | 10/2012 |
| CN | 103051691 A | 4/2013 |
| CN | 103294675 A | 9/2013 |
| CN | 103810047 A | 5/2014 |
| WO | 2011100366 A2 | 8/2011 |

* cited by examiner

DISTRIBUTED STORAGE AND REPLICATION SYSTEM AND METHOD

CROSS-REFERENCE TO RELATED APPLICATIONS

This application is a continuation of International Application No. PCT/CN2014/090445, filed on Nov. 6, 2014, the disclosure of which is hereby incorporated by reference in its entirety.

TECHNICAL FIELD

The present disclosure relates to the information technology (IT) field, and in particular, to a distributed storage and replication system and a method.

BACKGROUND

With the rapid development of information technologies and the wide application of the Internet, data generated by people increases in an explosive manner, which imposes a higher requirement on extensibility of data storage. Compared with a conventional storage array system, a distributed storage system has better extensibility and common hardware device compatibility, and can better meet a requirement for data storage in the future.

In the distributed storage system, generally, a large quantity of storage nodes are organized to form a distributed system, and data reliability is ensured by means of data replication and backup between different nodes, so that data has replicas on all the different storage nodes. How to ensure data consistency of multiple data replicas has become a problem confronting the distributed storage system for a long time. In a case of ensuring the data consistency, system performance and availability also become considerations of increasing importance.

FIG. 1 shows the existing two-phase commit protocol (2 Phase Commit, 2PC), which is a typical centralized strong-consistency replica control protocol and is used in many distributed database systems to ensure replica consistency.

In the two-phase commit protocol, a system generally includes two types of nodes: a coordinator (coordinator) and a participant (participant). The coordinator is responsible for execution of initiating voting on data updating and notifying a voting decision, and the participant participates in the voting on the data updating and executes the voting decision.

The two-phase commit protocol includes two phases: Phase 1 is a commit-request phase, where the coordinator instructs the participant to vote on data modification, and the participant notifies the coordinator of its own voting result: Yes or No; and Phase 2 is a commit phase, where the coordinator makes a decision: Commit or Abort according to the voting result in the first phase.

Successfully executing the two-phase commit protocol once requires at least two rounds of interaction between the coordinator and each participant with four messages, and excessive times of interaction degrade performance. In addition, in the two-phase commit protocol, if a node becomes faulty or continuously has no response, another input/output ("IO") request is blocked and finally fails due to a timeout, and a data rollback needs to be performed. Thus, the two-phase commit protocol has relatively low fault tolerance and availability.

SUMMARY

Embodiments of the present disclosure provide a distributed storage and replication system and a method for managing data storage and replication in a distributed storage system, so as to resolve a problem of low performance and low availability of an existing consistency replication protocol.

According to a first aspect, a distributed storage and replication system is provided, where the system includes at least one metadata control (MDC) module, multiple input/output ("IO") routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view according to the partition, where the partition view includes information about an OSD on which a partition in a partition group is located. The IO routing module is adapted to route a received IO request to an OSD node; and the OSD node is adapted to execute, according to the IO request, storage of data corresponding to the IO request, where the MDC determines that an OSD node in the system is a faulty OSD node, determines a partition on the faulty OSD node, updates a partition view of a partition group that includes the partition on the faulty OSD node, and sends an updating notification to a primary OSD node in the updated partition view. The primary OSD node is adapted to process, according to the updated partition view after receiving the updating notification sent by the MDC module, replication of the data corresponding to the IO request.

In a first possible implementation manner of the first aspect, the partition view includes a primary/secondary identity and a corresponding partition status that are of an OSD on which a partition in a partition group is located. The primary OSD node is further adapted to update, according to the updated partition view, a partition view locally stored on the primary OSD node. Processing, according to the updated partition view, replicates the data corresponding to the IO request and includes: replicating, according to the updated locally-stored partition view, the data corresponding to the IO request from the IO routing module onto a secondary OSD node whose partition status is consistent in the updated locally-stored partition view, or onto a secondary OSD node whose partition status is consistent in the updated locally-stored partition view and a secondary OSD node whose partition status is inconsistent in the updated locally-stored partition view but that is recovering data.

With reference to the first possible implementation manner of the first aspect, in a second possible implementation manner, the MDC module is further adapted to: generate an IO view, where the IO view includes an identifier of a primary OSD node of a partition group; and send the IO view to the IO routing module and the OSD node on which the partition in the partition view is located. The primary OSD node is further configured to: update, according to the updated partition view, an IO view locally stored on the primary OSD node, and process, according to the updated locally-stored IO view, replication of the data corresponding to the IO request.

With reference to the second possible implementation manner of the first aspect, in a third possible implementation manner, the MDC module is further adapted to: when determining that the partition on the faulty OSD node includes a primary partition, update an IO view of a partition group that includes the primary partition, and notify a secondary OSD node in the updated partition view of the updated IO view. The secondary OSD node in the updated partition view is configured to: update a locally stored IO view according to the updated IO view, and process, according to the updated locally-stored IO view, replication of the data corresponding to the IO request.

With reference to the third possible implementation manner of the first aspect, in a fourth possible implementation manner, the updating a partition view of a partition group that includes the partition on the faulty OSD node includes: when the partition on the faulty OSD node includes a secondary partition, marking a partition status of the faulty OSD node in a partition view of a partition group that includes the secondary partition as inconsistent; and when the partition on the faulty OSD node includes the primary partition, setting the faulty OSD node that serves as a primary OSD node in a partition view of the partition group that includes the primary partition as a new secondary OSD node, marking a partition status corresponding to the new secondary OSD node as inconsistent, selecting a secondary OSD node whose partition status is consistent from an original secondary OSD node in the partition view of the partition group that includes the primary partition, and setting the selected secondary OSD node as a new primary OSD node.

According to a second aspect, a distributed storage and replication system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute IO data storage according to the IO request, where the IO routing module is adapted to: receive the IO request, where the IO request includes a key; determine, according to the key, a partition group to which data corresponding to the IO request belongs, and determine a primary OSD node of the partition group to which the data belongs; add IO view version information of an IO view of the partition group to which the data belongs to the IO request; and send, to the determined primary OSD node, the IO request that carries the IO view version information; the primary OSD node is adapted to: receive the IO request; execute the IO request after determining, according to the IO view version information, that an IO view version in the IO request is consistent with an IO view version locally stored on the primary OSD node; generate a replication request that carries the IO view version information; and send the replication request to a secondary OSD node of the partition group to which the data belongs; and the secondary OSD node is adapted to: receive the replication request, and execute the replication request after determining, according to the IO view version information, that an IO view version in the replication request is consistent with an IO view version locally stored on the secondary OSD node, so that data corresponding to the IO request on the secondary OSD node keeps consistent with data corresponding to the IO request on the primary OSD node.

In a first possible implementation manner of the second aspect, the primary OSD node is further adapted to: return an error to the IO routing module after determining, according to the IO view version information, that the IO view version in the IO request is earlier than the IO view version locally stored on the primary OSD; and after determining that the IO view version in the IO request is later than the IO view version locally stored on the primary OSD, add the IO request to a cache queue, and query the MDC module for the IO view version information of the IO view of the partition group to which the data belongs, so as to execute the IO request after determining that the IO view version locally stored on the primary OSD is consistent with the IO view version in the IO request; and the IO routing module is adapted to: after receiving the error returned by the primary OSD node, query the MDC module for the IO view of the partition group to which the data belongs, and after obtaining updated IO view version information, send an IO request that carries the updated IO view version information.

With reference to the second aspect or the first possible implementation manner of the second aspect, in a second possible implementation manner, the IO view version information includes an IO view version number, and the primary OSD node further generates a sequence identifier for the IO request, and adds the sequence identifier to the replication request sent to the secondary OSD node, where the sequence identifier includes the IO view version number and a sequence number, and the sequence number indicates a serial number of a modify operation on data corresponding to a partition group in the IO view within an IO view version; and the secondary OSD node is further adapted to execute the replication request according to the sequence identifier.

With reference to the second possible implementation manner of the second aspect, in a third possible implementation manner, the replication request further carries a sequence identifier in a previous replication request sent by the primary OSD node for the partition group; and the secondary OSD node is adapted to: after receiving the replication request, execute the replication request when the sequence identifier in the previous replication request is consistent with a largest sequence identifier locally stored on the secondary OSD node.

With reference to the second aspect or the first, the second, and the third possible implementation manners of the second aspect, in a fourth possible implementation manner, the partition view includes a primary/secondary identity and a corresponding partition status that are of an OSD on which a partition in a partition group is located; and the MDC module is further adapted to: when detecting, in a process of processing the IO request, that the primary OSD node becomes faulty, set the primary OSD node in the partition view of the partition group to which the data belongs as a new secondary OSD node, and mark a partition status of the new secondary OSD as inconsistent, set any secondary OSD node of the secondary OSD node in the partition view of the partition group to which the data belongs as a new primary OSD node, notify the new primary OSD node of the updated partition view of the partition group to which the data belongs; and update, by using the new primary OSD node, the IO view of the partition group to which the data belongs, and notify the IO routing module of the updated IO view of the partition group to which the data belongs; the IO routing module is further adapted to: receive the updated IO view that is of the partition group and that is sent by the MDC module, and send the IO request to the new primary OSD node according to the updated IO view of the partition group; and the new primary OSD node is adapted to: receive the IO request, and after executing the IO request, generate a second replication request, and send the second replication request to a secondary OSD node whose partition status is consistent in the updated partition view of the partition group to which the data belongs.

With reference to the second aspect or the first, the second, and the third possible implementation manners of the second aspect, in a fifth possible implementation manner, the partition view includes a primary/secondary identity and a corresponding partition status that are of an OSD on which a partition in a partition group is located; and the MDC module is further adapted to: when detecting, in a process of processing the IO request, that any secondary OSD node of the secondary OSD node becomes faulty, mark a partition status of the any secondary OSD in the partition view of the partition group to which the data belongs as inconsistent, and notify the primary OSD node of the updated partition view of the partition group to which the data belongs; and the primary OSD node is adapted to: after receiving the updated partition view of the partition group to which the data belongs, send the replication request to a secondary OSD node whose partition status is consistent in the updated partition view, and skip sending the replication request to the secondary OSD node whose partition status is inconsistent.

According to a third aspect, a distributed storage and replication system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute, according to the IO request, storage of data corresponding to the IO request, where the OSD node is adapted to: send a query request to the MDC module after a failback to request an IO view of a partition group that includes a partition on the OSD node, where the OSD node is called a failback OSD node, and the query request carries an OSD identifier of the failback OSD node; receive the IO view returned by the MDC; initiate a data recovery request to a primary OSD in the IO view, to request to recover data updated by the failback OSD node during a failure; receive the data that is updated during the failure and that is sent by the primary OSD; and process replication of the IO request according to a partition view that is of the partition group and that is updated by the MDC module after the failback OSD node completes data recovery; the MDC module is adapted to: receive the query request of the failback OSD node, return the IO view to the failback OSD node according to the OSD identifier in the query request, and update the partition view of the partition group after the failback OSD node completes data recovery; and the primary OSD node is adapted to: receive the data recovery request of the failback OSD node, send the data updated during the failure to the failback OSD node, and process, according to the partition view that is of the partition group and that is updated by the MDC module after the failback OSD node completes data recovery, replication of data corresponding to the IO request.

In a first possible implementation manner of the third aspect, the primary OSD node is further adapted to: after receiving the data recovery request, receive the IO request sent by the IO routing module for the partition on the failback OSD node, execute the IO request, and send, to the failback OSD node, a replication request that carries IO key information and the data corresponding to the IO request; and the failback OSD node writes, to a log, the replication request that carries the IO key information and the data corresponding to the IO request, and update, according to a record of the log after the data recovery is completed, the data corresponding to the IO request to physical storage resources managed by the failback OSD node.

With reference to the first possible implementation manner of the third aspect, in a second possible implementation manner, the data recovery request carries a largest sequence identifier that is of an IO operation for the partition on the failback OSD node and that is locally recorded on the failback OSD node, where the largest sequence identifier comprises a latest IO view version number of the IO view of the partition group that includes the partition on the failback OSD node, and a largest serial number of a modify operation on data corresponding to a partition in the IO view corresponding to the latest IO view version number; and the sending the data updated during the failure to the failback OSD node includes: determining that the largest sequence identifier in the data recovery request is greater than or equal to a current smallest sequence identifier locally stored on the primary OSD node, sending an entry that the failback OSD node lacks during the failure to the failback OSD node, receiving a data recovery request initiated by the failback OSD node according to the entry, and sending data corresponding to the entry to the failback OSD node, where the smallest sequence identifier comprises a smallest IO view version number that is of the IO view of the partition group and that is stored on the primary OSD node, and a smallest serial number of a modify operation on data corresponding to a partition in the IO view corresponding to the smallest IO view version number.

With reference to the first possible implementation manner of the third aspect, in a third possible implementation manner, the data recovery request carries a largest sequence identifier that is of an IO operation for the partition on the failback OSD node and that is locally recorded on the failback OSD node, where the largest sequence identifier includes: a latest IO view version number of the IO view of the partition group that includes the partition on the failback OSD node, and a largest serial number of a modify operation on data corresponding to a partition in the IO view within the IO view corresponding to the latest IO view version number; and the sending the data updated during the failure to the failback OSD node includes: determining that the largest sequence identifier in the data recovery request is less than a current smallest sequence identifier locally stored on the primary OSD node, sending the current smallest sequence identifier locally stored on the primary OSD to the failback OSD node, receiving a data recovery request, initiated by the failback OSD node, for synchronizing all data corresponding to a primary partition that belongs to the partition group and that is on the primary OSD node, and sending all the data corresponding to the primary partition to the failback OSD node, where the smallest sequence identifier comprises a smallest IO view version number that is of the IO view of the partition group and that is stored on the primary OSD node, and a smallest serial number of a modify operation on data corresponding to a partition in the IO view corresponding to the smallest IO view version number.

According to a fourth aspect, a distributed storage and replication system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view according to the partition, where the partition view includes information about an OSD on which a partition in a partition group is located; the IO routing module is adapted to route a received IO request to an OSD node; and the OSD node is adapted to execute, according to the IO request, storage of data corresponding to the IO request, where the system includes a memory and a processor, where the memory is adapted to store a computer readable instruction, and the instruction is used to execute functions of the MDC module, the IO routing module, and the OSD node; and the processor is adapted to: be connected to the memory, read the instruction in the memory, and enable, according to the instruction, the processor to execute the following operations: determining that an OSD node in the system is a faulty OSD node, determining a partition on the faulty OSD node, updating a partition view of a partition group that includes the partition on the faulty OSD node, and sending an updating notification to a primary OSD node on which the partition group in the updated partition view is located, so that the primary OSD node processes, according to the updated partition view, replication of data corresponding to the IO request.

According to a fifth aspect, a distributed storage and replication system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute, according to the IO request, storage of data corresponding to the IO request, where the system includes a memory and a processor, where the memory is adapted to store a computer readable instruction, and the instruction is used to execute functions of the MDC module, the IO routing module, and the OSD node; and the processor is adapted to: be connected to the memory, read the instruction in the memory, and enable, according to the instruction, the processor to execute the following operations: enabling the IO routing module to: receive the IO request, where the IO request includes a key; determine, according to the key, a partition group to which data corresponding to the IO request belongs, and determine a primary OSD node of the partition group to which the data belongs; add IO view version information of an IO view of the partition group to which the data belongs to the IO request; and send, to the determined primary OSD node, the IO request that carries the IO view version information; enabling the primary OSD node to: receive the IO request; execute the IO request after determining, according to the IO view version information, that an IO view version in the IO request is consistent with a locally stored IO view version; generate a replication request that carries the IO view version information; and send the replication request to a secondary OSD node of the partition group to which the data belongs; and enabling the secondary OSD node to: receive the replication request, and execute the replication request after determining, according to the IO view version information, that an IO view version in the replication request is consistent with an IO view version locally stored on the secondary OSD node, so that data corresponding to the IO request on the secondary OSD node keeps consistent with data corresponding to the IO request on the primary OSD node.

According to a sixth aspect, a distributed storage and replication system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute, according to the IO request, storage of data corresponding to the IO request, where the system includes a memory and a processor, where the memory is adapted to store a computer readable instruction, and the instruction is used to execute functions of the MDC module, the IO routing module, and the OSD node; and the processor is adapted to: be connected to the memory, read the instruction in the memory, and enable, according to the instruction, the processor to execute the following operations: enabling the OSD node to: send a query request to the MDC module after a failback to request an IO view of a partition group that includes a partition on the OSD node, where the OSD node is called a failback OSD node, and the query request carries an OSD identifier of the failback OSD node; receive the IO view returned by the MDC; initiate a data recovery request to a primary OSD in the IO view, to request to recover data updated by the failback OSD node during a failure; receive the data that is updated during the failure and that is sent by the primary OSD; and process replication of the IO request according to a partition view that is of the partition group and that is updated by the MDC module after the failback OSD node completes data recovery; enabling the MDC module to: receive the query request of the failback OSD node, return the IO view to the failback OSD node according to the OSD identifier in the query request, and update the partition view of the partition group after the failback OSD node completes data recovery; and enabling the primary OSD node to: receive the data recovery request of the failback OSD node, send the data updated during the failure to the failback OSD node, and process, according to the partition view that is of the partition group and that is updated by the MDC module after the failback OSD node completes data recovery, replication of the data corresponding to the IO request.

According to a seventh aspect, a method for managing data storage and replication in a distributed storage system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view according to the partition, where the partition view includes information about an OSD on which a partition in a partition group is located; the IO routing module is adapted to route a received IO request to an OSD node; and the OSD node is adapted to execute, according to the IO request, storage of data corresponding to the IO request, where the method includes: determining that an OSD node in the system is a faulty OSD node, determining a partition on the faulty OSD node, updating a partition view of a partition group that includes the partition on the faulty OSD node, and sending an updating notification to a primary OSD node in the updated partition view; and the primary OSD node is adapted to process, according to the updated partition view after receiving the updating notification sent by the MDC module, replication of the data corresponding to the IO request.

In a first possible implementation manner of the seventh aspect, the partition view includes a primary/secondary identity and a corresponding partition status that are of an OSD on which a partition in a partition group is located; and the primary OSD node is further adapted to update, according to the updated partition view, a partition view locally stored on the primary OSD node; and the processing, according to the updated partition view, replication of the data corresponding to the IO request includes: replicating, according to the updated locally-stored partition view, the data corresponding to the IO request from the IO routing module onto a secondary OSD node whose partition status is consistent in the updated locally-stored partition view, or onto a secondary OSD node whose partition status is consistent in the updated locally-stored partition view and a secondary OSD node whose partition status is inconsistent in the updated locally-stored partition view but that is recovering data.

With reference to the first possible implementation manner of the seventh aspect, in a second possible implementation manner, the method further includes: when determining that the partition on the faulty OSD node includes a primary partition, updating, by the MDC module, an IO view of a partition group that includes the primary partition, and notifying a secondary OSD node in the updated partition view of the updated IO view; and updating, by the secondary OSD node in the updated partition view, a locally stored IO view according to the updated IO view, and processing, according to the updated locally-stored IO view, replication of the data corresponding to the IO request.

With reference to the second possible implementation manner of the seventh aspect, in a third possible implementation manner, the updating a partition view of a partition group that includes the partition on the faulty OSD node includes: when the partition on the faulty OSD node includes a secondary partition, marking a partition status of the faulty OSD node in a partition view of a partition group that includes the secondary partition as inconsistent; and when the partition on the faulty OSD node includes the primary partition, setting the faulty OSD node that serves as a primary OSD node in a partition view of the partition group that includes the primary partition as a new secondary OSD node, marking a partition status corresponding to the new secondary OSD node as inconsistent, selecting a secondary OSD node whose partition status is consistent from an original secondary OSD node in the partition view of the partition group that includes the primary partition, and setting the selected secondary OSD node as a new primary OSD node.

According to an eighth aspect, a method for managing data storage and replication in a distributed storage system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute IO data storage according to the IO request, where the method includes: the IO routing module is adapted to: receive the IO request, where the IO request includes a key; determine, according to the key, a partition group to which data corresponding to the IO request belongs, and determine a primary OSD node of the partition group to which the data belongs; add IO view version information of an IO view of the partition group to which the data belongs to the IO request; and send, to the determined primary OSD node, the IO request that carries the IO view version information; the primary OSD node is adapted to: receive the IO request; execute the IO request after determining, according to the IO view version information, that an IO view version in the IO request is consistent with an IO view version locally stored on the primary OSD node; generate a replication request that carries the IO view version information; and send the replication request to a secondary OSD node of the partition group to which the data belongs; and the secondary OSD node is adapted to: receive the replication request, and execute the replication request after determining, according to the IO view version information, that an IO view version in the replication request is consistent with an IO view version locally stored on the secondary OSD node, so that data corresponding to the IO request on the secondary OSD node keeps consistent with data corresponding to the IO request on the primary OSD node.

With reference to a first possible implementation manner of the eighth aspect, the partition view includes a primary/secondary identity and a corresponding partition status that are of an OSD on which a partition in a partition group is located; and the method further includes: when detecting, in a process of processing the IO request, that the primary OSD node becomes faulty, setting, by the MDC module, the primary OSD node in a partition view of the partition group to which the data belongs as a new secondary OSD node, marking a partition status of the new secondary OSD as inconsistent; setting any secondary OSD node of the secondary OSD node in the partition view of the partition group to which the data belongs as a new primary OSD node, notifying the new primary OSD node of the updated partition view of the partition group to which the data belongs; and updating, by using the new primary OSD node, the IO view of the partition group to which the data belongs, and notifying the IO routing module of the updated IO view of the partition group to which the data belongs; the IO routing module is further adapted to: receive the updated IO view that is of the partition group and that is sent by the MDC module, and send the IO request to the new primary OSD node according to the updated IO view of the partition group; and the new primary OSD node is adapted to: receive the IO request, and after executing the IO request, generate a second replication request, and send the second replication request to a secondary OSD node whose partition status is consistent in the updated partition view of the partition group to which the data belongs.

With reference to a second possible implementation manner of the second aspect, the partition view includes a primary/secondary identity and a corresponding partition status that are of an OSD on which a partition in a partition group is located; and the method further includes: when detecting, in a process of processing the IO request, that any secondary OSD node of the secondary OSD node becomes faulty, marking, by the MDC module, a partition status of the any secondary OSD node in the partition view of the partition group to which the data belongs as inconsistent, and notifying the primary OSD node of the updated partition view of the partition group to which the data belongs; and the primary OSD node is adapted to: after receiving the updated partition view of the partition group to which the data belongs, send the replication request to a secondary OSD node whose partition status is consistent in the updated partition view, and skip sending the replication request to the secondary OSD node whose partition status is inconsistent.

According to a ninth aspect, a method for managing data storage and replication in a distributed storage system is provided, where the system includes at least one metadata control (MDC) module, multiple IO routing modules, and multiple object-based storage device (OSD) nodes, where the MDC module is adapted to: configure, for each OSD node, at least one logical partition corresponding to physical storage resources managed by each OSD node, where the at least one partition is a primary partition, a secondary partition, or any combination of primary and secondary partitions, a primary partition and a secondary partition corresponding to the primary partition constitute a partition group, a primary partition and a secondary partition in a same partition group are located on different OSD nodes, an OSD node on which a primary partition is located is a primary OSD node of a partition group that includes the primary partition, and an OSD node on which a secondary partition is located is a secondary OSD node of a partition group that includes the secondary partition; and generate a partition view and an IO view according to the partition, where the partition view includes information about an OSD on which a partition in a partition group is located, and the IO view includes an identifier of a primary OSD of a partition group; the IO routing module is adapted to route a received IO request to an OSD node; and the OSD node is adapted to execute, according to the IO request, storage of data corresponding to the IO request, where the method includes: the OSD node is adapted to: send a query request to the MDC module after a failback to request an IO view of a partition group that includes a partition on the OSD node, where the OSD node is called a failback OSD node, and the query request carries an OSD identifier of the failback OSD node; receive the IO view returned by the MDC; initiate the data recovery request to a primary OSD in the IO view, to request to recover data updated by the failback OSD node during a failure; receive the data that is updated during the failure and that is sent by the primary OSD; and process replication of the IO request according to a partition view that is of the partition group and that is updated by the MDC module after the failback OSD node completes data recovery; the MDC module is adapted to: receive the query request of the failback OSD node, return the IO view to the failback OSD node according to the OSD identifier in the query request, and update the partition view of the partition group after the failback OSD node completes data recovery; and the primary OSD node is adapted to: receive a data recovery request of the failback OSD node, send the data updated during the failure to the failback OSD node, and process, according to the partition view that is of the partition group and that is updated by the MDC module after the failback OSD node completes data recovery, replication of data corresponding to the IO request.

BRIEF DESCRIPTION OF DRAWINGS

To describe the technical solutions in the embodiments of the present disclosure more clearly, the following briefly describes the accompanying drawings describing the embodiments. The accompanying drawings merely depict some embodiments of the present disclosure, and a person of ordinary skill in the art may still derive other embodiments from these accompanying drawings and detailed description, all of which are contemplated by the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
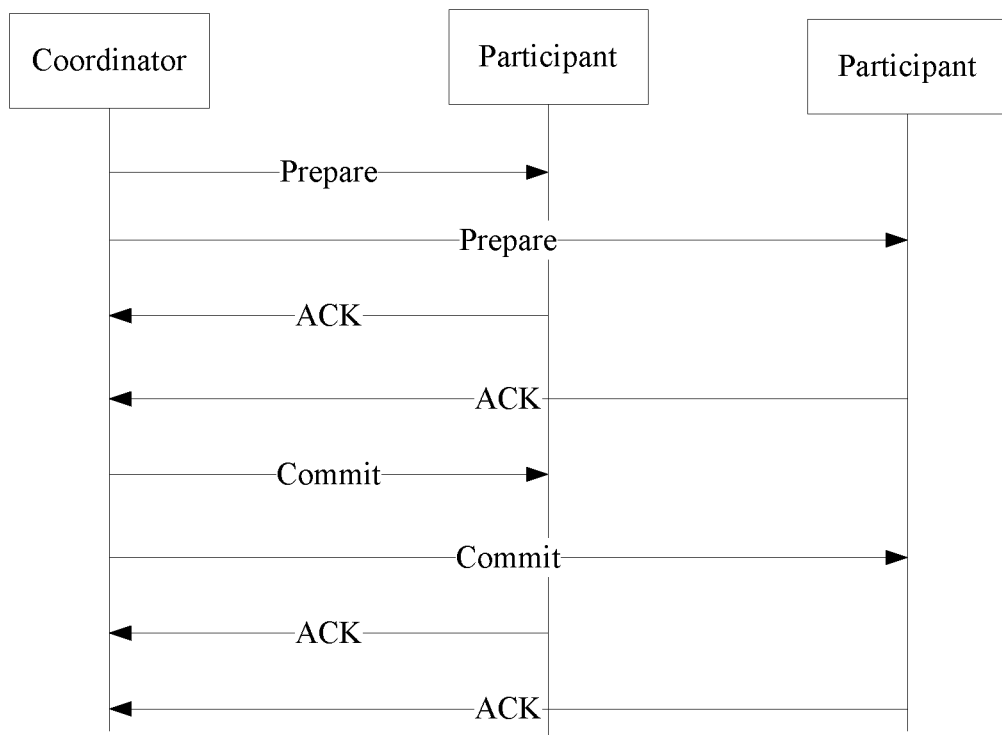
FIG. 1 is a flowchart of the two-phase commit protocol in the prior art.
Figure 2A:
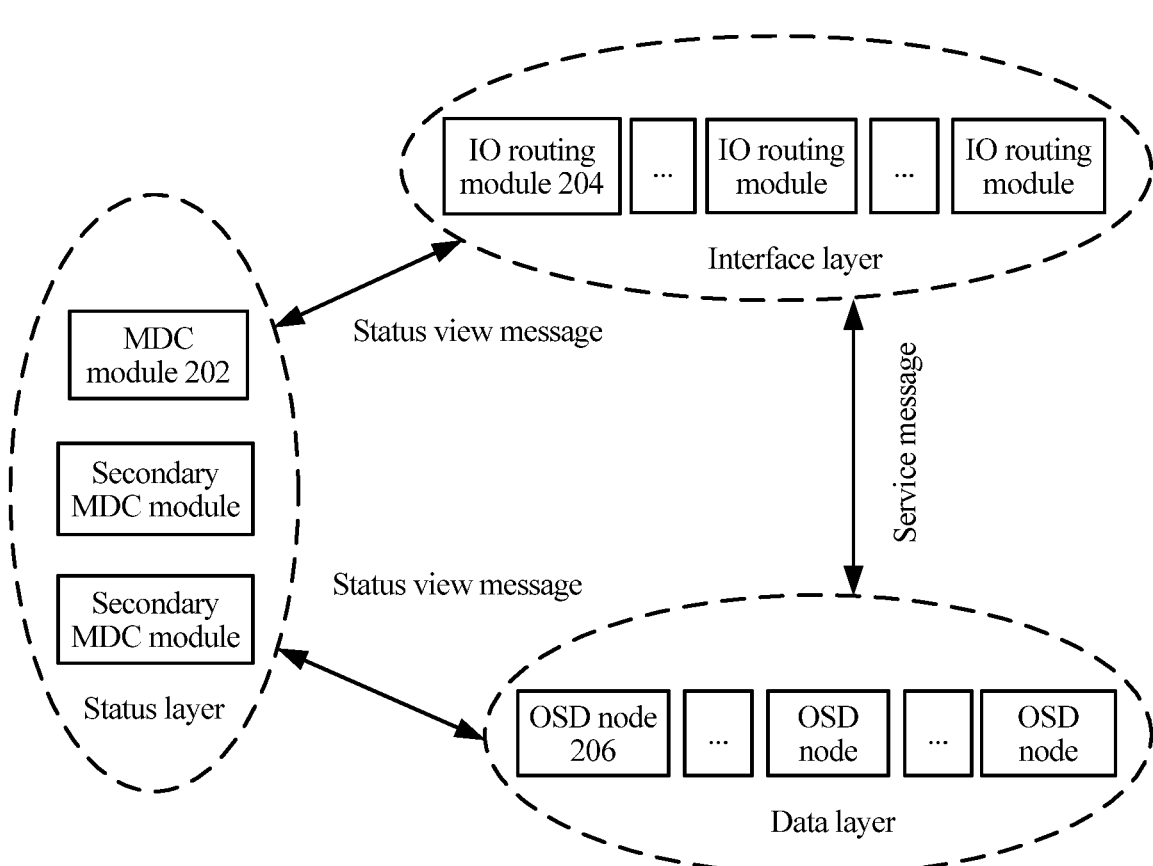
FIG. 2A is a schematic architecture diagram of a distributed storage and replication system according to an embodiment of the present disclosure.

As shown in FIG. 2A, a specific embodiment of the present disclosure provides a distributed storage and replication control system, so as to manage and control data storage and replication mentioned in this embodiment of the present disclosure. The distributed storage and replication control system mainly includes three sub-layers: a status layer, an interface layer, and a data layer. The status layer includes a metadata control (MDC) module 202, and in an actual application, whether a secondary MDC needs to be configured and a quantity of secondary MDCs may be determined according to a requirement, where the secondary MDC is adapted to play the role of a primary MDC when the primary MDC module becomes faulty. The interface layer includes multiple IO (input/output) routing modules 204 (which may also be called clients, and the two concepts may be interchangeable in implementation of the present disclosure). The data layer includes multiple object-based storage device object storage device (OSD) nodes 206. The status layer communicates with the interface layer and the data layer by using a status view message. For example, the MDC module 202 sends an updating notification to the IO routing module 204 and the OSD node 206 by using the status view message, so as to instruct the IO routing module 204 and the OSD node 206 to update a local cluster view (which may also be called a view, and the two concepts may be interchangeable in implementation of the present disclosure); or directly sends a cluster view generated or updated by the MDC module 202 to the IO routing module 204 and the OSD node 206. The interface layer and the data layer communicate with each other by using a service message. For example, the IO routing module 204 sends an IO request message to the OSD node 206 to request IO data storage and replication.

The MDC module 202, as an entrance for delivery of cluster configuration information, is adapted to allocate a logical partition of logical storage resources in application storage space to each OSD node, generate a cluster view according to the partition, maintain and update the cluster view, and notify the corresponding IO routing module 204 and the OSD node 206 of cluster view updating.

The IO routing module 204 is adapted to route and forward an IO request of an upper-layer application to a corresponding OSD node according to the cluster view.

The OSD node 206 is adapted to: execute a related IO operation on the IO request according to the cluster view, where the related IO operation mainly includes storing and replicating data, to implement data backup consistency; and organize a data operation on physical storage resources (for example, local disk or external storage resources) managed by the OSD node 206.

It may be understood that the foregoing MDC module, IO routing module, and OSD node may be implemented by hardware, firmware, software, or a combination thereof. In an actual application, a specific implementation manner is determined in consideration of a product design requirement or manufacturing costs, and the present disclosure shall not be limited to a particular implementation manner.

Figure 2B:
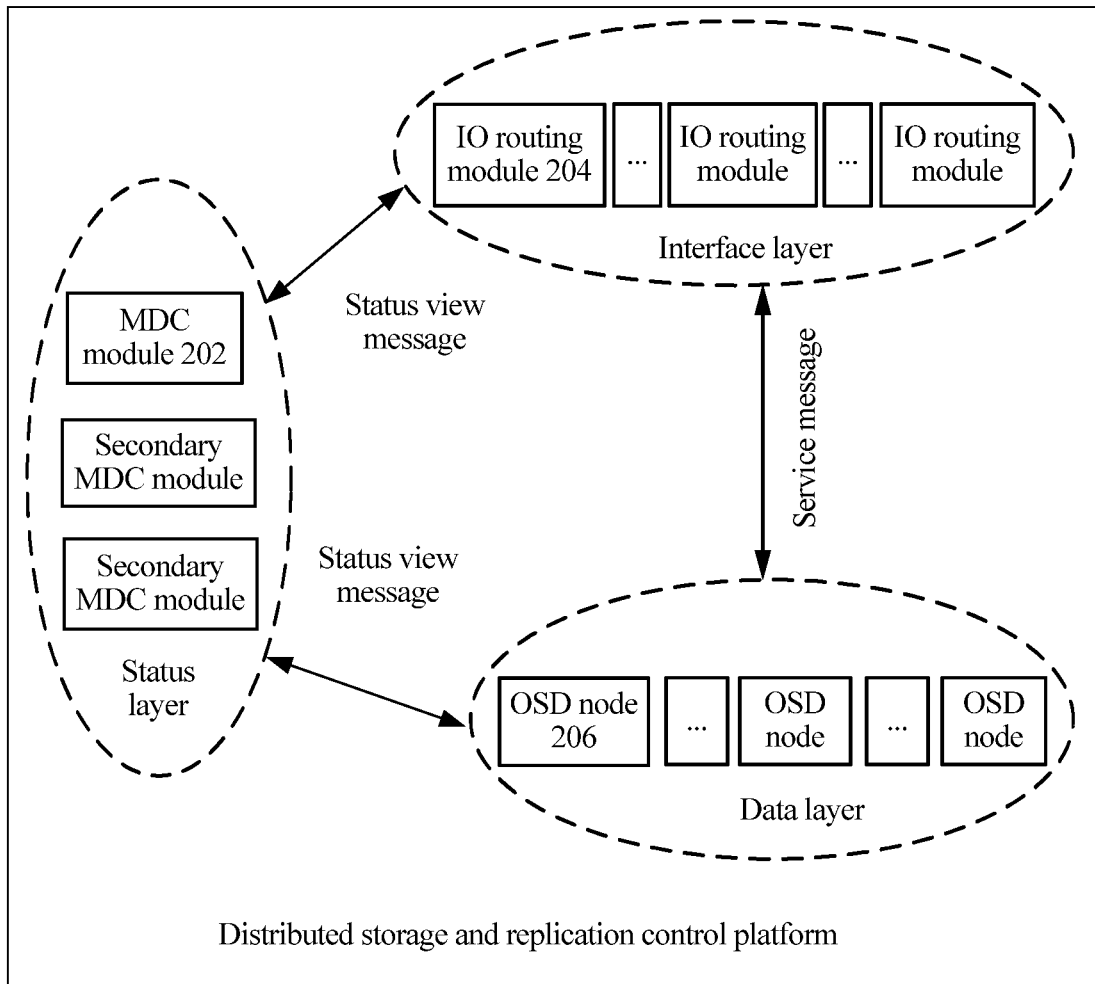
FIG. 2B is a schematic structural diagram of a distributed storage and replication system according to another embodiment of the present disclosure.

In a specific embodiment of the present disclosure, the entire distributed storage and replication system may be deployed on an independent platform or server (for example, a distributed storage and replication control platform in FIG. 2B), so as to manage data replication and storage in a distributed storage system connected to the platform or server.

Figure 2C:
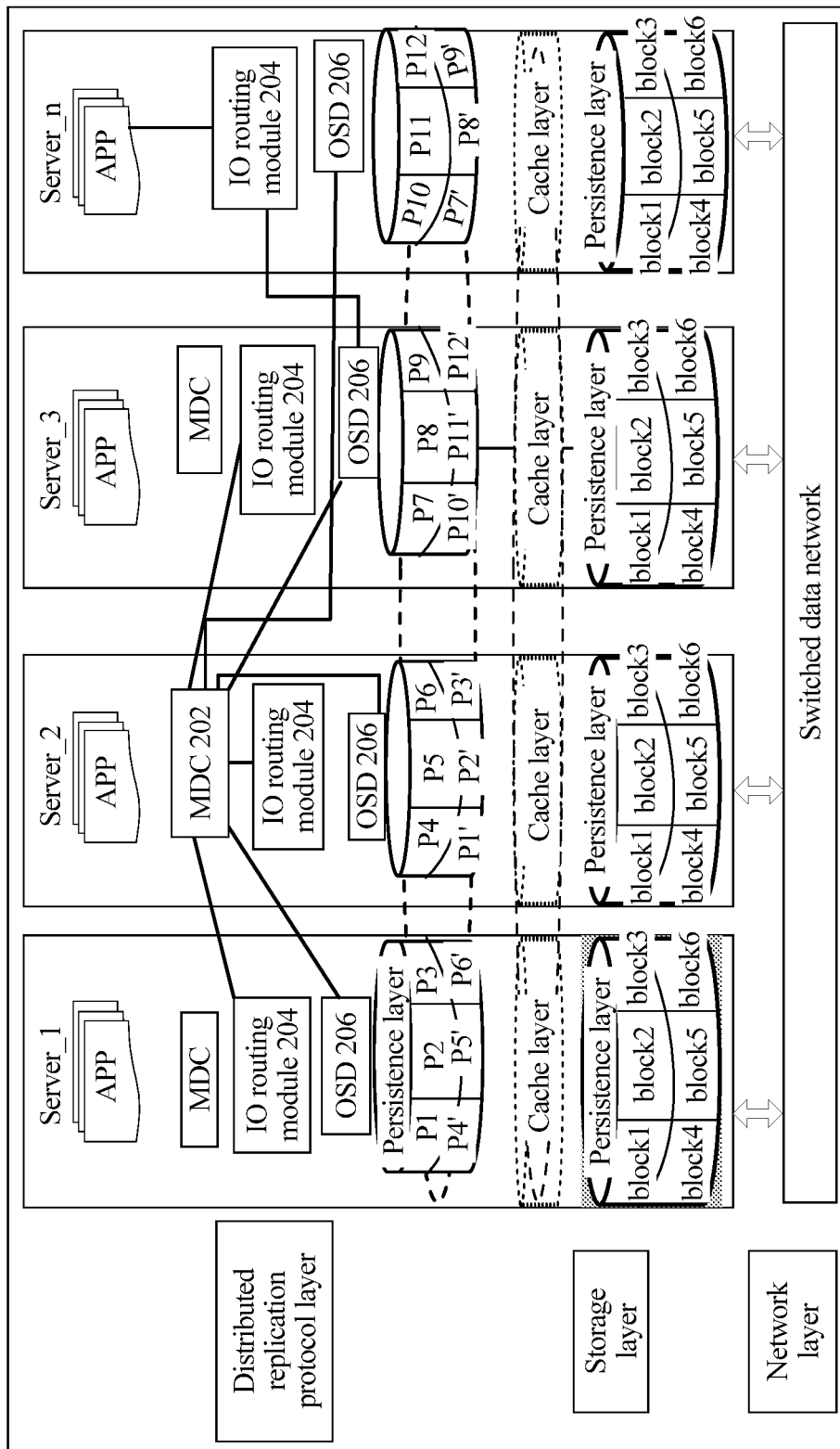
FIG. 2C is a schematic structural diagram of a distributed storage and replication system according to another embodiment of the present disclosure.

In another specific embodiment of the present disclosure, the distributed storage and replication control system may be deployed, in a distributed manner, in a distributed storage system shown in FIG. 2C. The distributed storage system includes multiple servers or hosts, where the host or server in this embodiment is a physical host or server, that is, includes hardware such as a processor and a memory. The foregoing MDC module 202 may be deployed only on one server or host (no secondary MDC), or on two servers or hosts (one primary MDC module and one secondary MDC module), or on three servers or hosts (one primary MDC module and two secondary MDC modules) in the distributed storage system; the IO routing module 204 is deployed on each server or host in the distributed storage system; and the OSD node 206 is deployed on each server or host that has storage resources in the distributed storage system, so as to manage and control local storage resources or external storage resources. In an actual application, either the IO routing module or the OSD node, or both the IO routing module and the OSD node may be deployed on one host, and a specific deployment manner may be determined according to an actual specific situation, which is not limited in the present disclosure. The MDC module 202, the IO routing module 204, and the OSD node 206 in FIG. 2C constitute a distributed storage control system, which is called a distributed replication protocol layer in the distributed storage system shown in FIG. 2B. The distributed storage system controls IO data storage and replication to storage resources at a storage layer by using the distributed replication protocol layer. The storage layer includes local storage resources on the multiple servers or hosts, and the modules that are at the distributed replication protocol layer and are distributed on the server or host interact with each other by using a switched data network at a network layer. In a specific implementation manner, Ethernet or InfiniBand (TB) may be used. It should be understood that the foregoing Ethernet or InfiniBand is merely an exemplary implementation manner of a high-speed switched data network used in this embodiment of the present disclosure, which is not limited in this embodiment of the present disclosure.

The following uses specific embodiments and implementation manners to describe connection and interaction, specific functions, and the like of the MDC module 202, the IO routing module 204, and the OSD node 206 in the foregoing distributed storage and replication control system in detail.

In a specific embodiment of the present disclosure, a partitioning function of the MDC module may include: the MDC module configures, for each OSD node according to a status of physical storage resources managed by each OSD node, a logical partition corresponding to the physical storage resources managed by each OSD node. The partition includes a particular quantity of data blocks in application storage space. Compared with physical storage space at the storage layer, the application storage space at an application layer is a particular amount of logical storage space allocated by the application layer to a user, and is logical mapping of the physical storage space at the storage layer. That is, a concept of the partition herein is different from a concept of a physical storage space partition. When data is being stored, space of one partition in the application storage space may be mapped to one or more partitions in the physical storage space. A specific granularity of the partition may be acquired from cluster configuration information, or may be determined by the MDC module according to a particular rule or determined in another manner, which is not limited in the present disclosure.

In a specific implementation manner, the MDC module may generate a cluster view of the partition according to information such as partition size configuration information, a local storage resource status, and an external storage resource status (for example, LUN (Logical Unit Number, logical unit number) information of a normally accessed SAN (Storage Area Network, storage area network)).

Generally, to ensure data reliability and availability, a partition has replicas stored on different OSD nodes, and a partition replica quantity may be configured by using a configuration file, or may be determined by the MDC according to a particular algorithm. There is a primary partition and a secondary partition by classification: One replica is selected from the multiple replicas of the partition as a primary replica, and the primary replica is called a primary partition; a replica except the primary replica of the partition is called a secondary partition. A primary partition and a secondary partition corresponding to the primary partition constitute a partition group, an OSD node on which a primary partition is located is called a primary OSD node of a partition group that includes the primary partition, and a primary OSD described in this embodiment refers to a primary OSD of a partition group; an OSD node on which a secondary partition is located is called a secondary OSD node of a partition group that includes the secondary partition, and a secondary OSD described in this embodiment refers to a secondary OSD for a partition group.

To facilitate understanding, the following provides a further description with reference to the embodiment provided in FIG. 2C. As shown in FIG. 2C, storage resources managed by an OSD on a host or server server_1 (concepts of the host and the server in this embodiment of the present disclosure may be interchangeable) are divided into a partition 1, a partition 2, and a partition 3 (P1, P2, and P3 for short) and a partition 4', a partition 5', and a partition 6' (P4', P5', and P6' for short), where the P4', the P5', and the P6' are replicas of a partition 4, a partition 5, and a partition 6 (P4, P5, and P6 for short) on an OSD node on a server server_2 respectively. There is a corresponding mapping relationship between the partitions on the OSD on the server_1 and the physical storage resources at the storage layer. For example, space of one partition on the OSD is mapped to one or more Blocks in the physical storage space.

The OSD on the host or server server_1 manages primary partitions (the P1, the P2, and the P3) and secondary partitions (the P4', the P5', and the P6'), and the OSD is separately a primary OSD node of a partition group that includes the P1 and a P1', a primary OSD node of a partition group that includes the P2 and a P2', and a primary OSD node of a partition group that includes the P3 and a P3'; in addition, the OSD is separately a secondary OSD node of a partition group that includes the P4 and the P4', a secondary OSD node of a partition that includes the P5 and the P5', and a secondary OSD node of a partition that includes the P6 and the P6'. It can be learned that for different partition groups, a same OSD node may serve as a primary OSD node and a secondary OSD node at the same time.

The foregoing partition and the corresponding replicas may be set according to the following factors, and in a specific actual application, another factor may be taken into consideration to set and plan a disk partition.

First, data security: replicas of each partition should be distributed to different hosts or servers as much as possible. A bottom line of data security is that multiple replicas of a partition are not allowed to be placed on a same host or server. Second, data balance: a quantity of partitions on each OSD keeps the same as much as possible. A quantity of primary partitions, a quantity of secondary partitions 1, and a quantity of secondary partitions 2 on each OSD keep the same as much as possible, so that services processed on all the OSDs are balanced, and no hot spot appears. Third, data dispersion: replicas of a partition on each OSD should be distributed to other different OSDs as evenly as possible, and a same requirement is true of a higher-level physical component.

Figure 3:
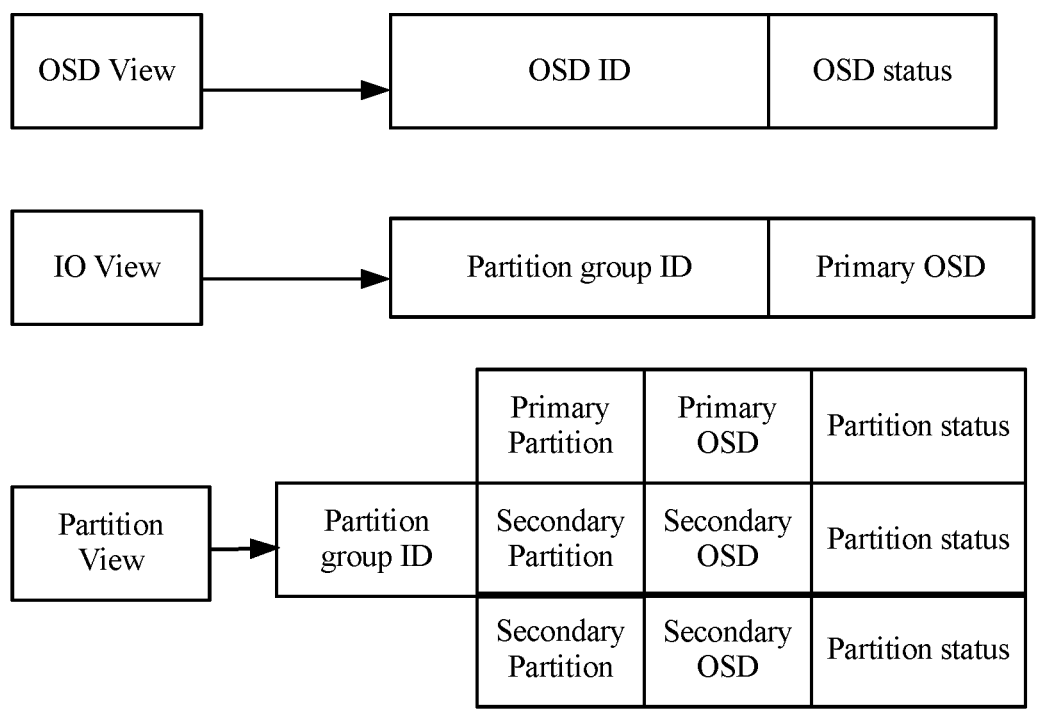
FIG. 3 is a schematic diagram of a cluster view according to an embodiment of the present disclosure.

As shown in FIG. 3, in a specific embodiment of the present disclosure, that the MDC module generates cluster view information may include: the MDC generates the cluster view information according to cluster configuration information delivered by an administrator and a partitioning situation. The cluster view information includes cluster views in three dimensions: an OSD view (OSD view), an IO view (IO view), and a Partition view (partition view).

Figure 4:
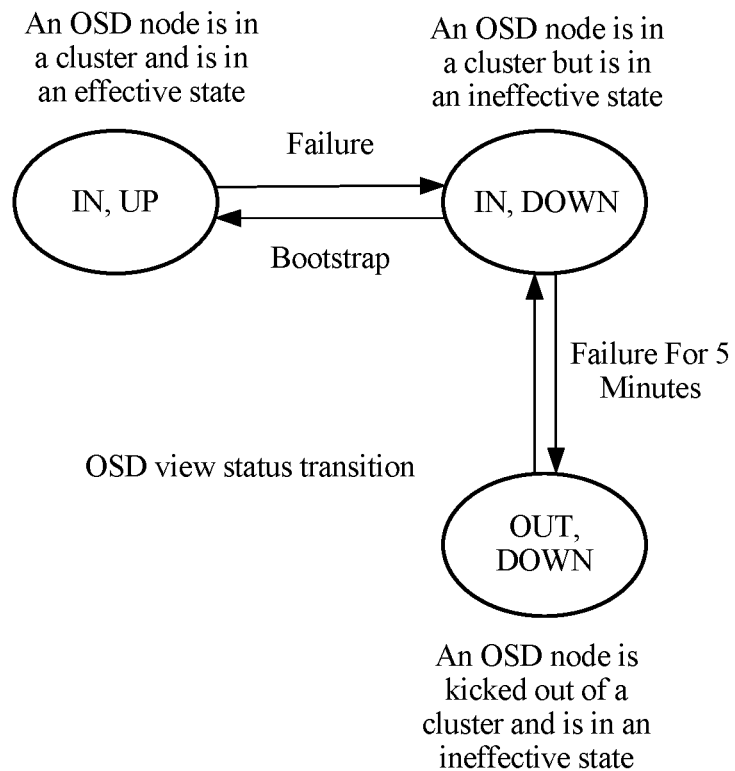
FIG. 4 is a schematic diagram of an OSD view status transition according to an embodiment of the present disclosure.

The OSD view includes status information of an OSD node in a cluster. In a specific implementation manner, the OSD view may include an ID of an OSD node and status information of the OSD node, where the OSD ID is an OSD marker or number. In an embodiment of the present disclosure shown in FIG. 4, an OSD status may be classified into an "UP" state and a "DOWN" state according to whether the OSD is faulty, and classified into an "OUT" state and an "IN" state according to whether the OSD exits from a cluster. As shown in FIG. 4, a specific status transition includes: after a failback, an OSD node is initialized or restarted and then transits from an "IN" and "DOWN" state to an "IN" and "UP" state. When a failure of an OSD lasts over a particular threshold (for example, over 5 minutes), the OSD node is kicked out of the cluster, and accordingly, the OSD node transits from an "IN" and "DOWN" state to an "OUT" and "DOWN" state. In a specific embodiment of the present disclosure, the OSD view may further include OSD view version information, such as an OSD view version number, an OSD view ID, or any other information that marks a view version.

The IO view includes an identifier that identifies a primary OSD node of a partition group. In a specific implementation manner, the IO view may include a partition group ID and an identifier of a primary OSD node of a partition group corresponding to the partition group ID. Each IO view has IO view version information that identifies the IO view, where the IO view version information may be an IO view ID (which may also be called an IO view version number), which is used to identify a version of the IO view, so as to help different modules compare IO view versions. In a specific embodiment, the IO view version information may be included in the IO view, or may be excluded from the IO view.

The partition view includes information about an OSD on which a partition in a partition group is located. In a specific implementation manner, the partition view may include a partition group ID, an OSD on which each partition in a partition group corresponding to the partition group ID is located and a primary/secondary identity of the OSD, and a partition status corresponding to the OSD of each partition. The partition view includes information about an OSD node on which a primary partition is located (such as an OSD node ID, a primary/secondary identity of the OSD node, and a partition status corresponding to the OSD node of the primary partition) and information about an OSD node on which a secondary partition (there may be one or more secondary partitions) corresponding to the primary partition is located (such as an OSD node ID, a primary/secondary identity of the OSD node, and a partition status corresponding to the OSD of the secondary partition). In a specific embodiment, the partition status may be classified into two types: "consistent" and "inconsistent", where "consistent" indicates that data in a secondary partition is consistent with that in a primary partition, and "inconsistent" indicates that data in a secondary partition may be inconsistent with that in a primary partition. Each partition view has partition view version information that identifies the partition view, where the partition view version information may be a partition view ID (which may also be called a partition view version number), so that the modules compare view versions. In a specific embodiment, the partition view version information may be included in the partition view, or may be excluded from the partition view. In a specific embodiment, because the IO view is a subset of the partition view, that is, the partition view includes IO view information, the partition view may further include the IO view version information.

The MDC is further adapted to: maintain, manage, and update the cluster view; update the cluster view according to an OSD node status, such as a failure, a failback, exiting from a cluster after a failure, rejoining a cluster after a failback, and newly joining a cluster; and notify a related module of cluster view updating, so that the related module processes, according to the updated cluster view, replication of data corresponding to a corresponding IO request.

In a specific implementation manner, to reduce interaction and save management and storage resources, the OSD view may exist only on the MDC, the partition view may exist only on the MDC module and the primary OSD node, and the IO view exists on the MDC module, the IO routing module, the primary OSD node, and the secondary OSD node. The MDC module sends the partition view only to a primary OSD node on which a partition in the partition view is located, or instructs only a primary OSD node on which a partition in the partition view is located to update a local partition view; and sends the IO view that constitutes a part of the partition view (that is, the IO view may be regarded as a subview of the partition view) to the IO routing module, the primary OSD node, and the secondary OSD node, or instructs a corresponding module to update a locally stored IO view. For a specific implementation process, refer to the following specific procedures and a procedure in which an OSD joins a cluster. In an actual application, the MDC module may set cluster views in different forms according to configuration information or a particular policy and according to basic functions of the cluster views, which is not limited in this embodiment of the present disclosure.

In a specific embodiment of the present disclosure, the IO routing module is mainly adapted to implement an IO request routing function. The IO routing module acquires IO views of all partitions in the cluster from the MDC module and caches the IO views. When the service IO request arrives at the IO routing module, the IO routing module obtains, by means of calculation (a hash algorithm or another algorithm may be used in a calculation method) by using a key in the IO request, a partition group to which IO belongs; then searches the locally stored IO views to find a primary OSD node corresponding to the partition group, and sends the IO request to the primary OSD node. The IO routing module processes an IO view updating notification received from the MDC module, where the updating notification may include the updated IO view or corresponding updating indication information, which indicates, for example, content that is to be updated; updates a locally stored IO view according to the updating notification, and routes the IO request according to the updated locally-stored IO view. For a specific implementation process, refer to the following specific procedures.

In a specific embodiment of the present disclosure, that the OSD node processes the IO request according to the cluster view to execute an IO operation includes the following:

When the OSD node serves as a primary OSD node, the primary OSD node is mainly adapted to: receive the IO request sent by the IO routing module, execute the IO request, and send a replication request to a corresponding secondary OSD node, so as to execute IO data storage and replication. The primary OSD node receives a partition view of a partition on the primary OSD node from the MDC module, and stores the partition view. The primary OSD node processes replication of the IO request according to the partition view. The primary OSD node further receives, from the MDC module, an updating notification about the partition view, updates the locally stored partition view according to the updating notification, and processes, according to the updated partition view, replication of data corresponding to the IO request, where the updating notification may include the updated partition view or corresponding updating information, so that the OSD node updates the locally stored partition view and IO view according to the updated partition view or the updating information. When the OSD node serves as a secondary OSD node, the secondary OSD node is adapted to: receive a replication request of a primary OSD node, and perform data replication and backup according to the replication request; receive an IO view of a partition to which data on the secondary OSD node belongs from the MDC module, and store the IO view, and process, according to the IO view, replication of data corresponding to the IO request; and further receive, from the MDC module, an updating notification about the IO view, update the locally stored IO view according to the updating notification, and process, according to the updated IO view, replication of the data corresponding to the IO request. For a specific implementation process, refer to the following specific procedures.

Figure 5:
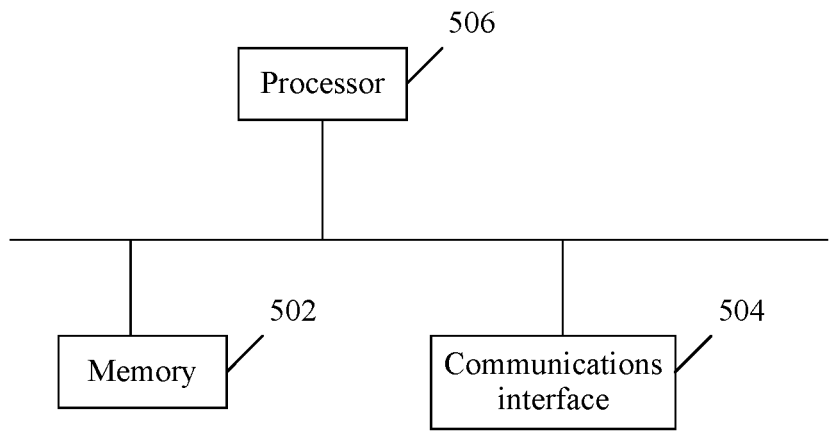
FIG. 5 is a schematic structural diagram of a distributed storage and replication system according to another embodiment of the present disclosure.

In a specific embodiment of the present disclosure, the distributed storage and replication system (shown in FIG. 2A, FIG. 2B, and FIG. 2C) in the foregoing embodiment may be implemented based on a system shown in FIG. 5. As shown in FIG. 5, the system may include one or more memories 502, one or more communications interfaces 504, and one or more processors 506, or another data interaction network (which is used for interaction between multiple processors and memories, and is not shown in the figure).

The memory 502 may be a memory of various types such as a read-only memory (ROM), a static storage device, a dynamic storage device, or a random access memory (RAM). The memory 502 may store an operating system and an instruction and application data of another application program, where the instruction includes an instruction used for executing functions of an MDC module, and IO routing module, and an OSD node in various embodiments of the present disclosure.

The instruction stored in the memory 502 is run and executed by the processor 506.

The communications interface 504 is adapted to implement communication between the memory 502 and the processor 506, communication between processors, communication between memories, and communication between the system and another device or a communications network.

The processor 506 may be a general purpose central processing unit (Central Processing Unit, CPU), a microprocessor, an application-specific integrated circuit (ASIC), or one or more integrated circuits, and is adapted to execute a related program, so as to execute procedures of interaction among the MDC module, the IO routing module, and the OSD node described in and the functions implemented in various embodiments of the present disclosure.

To facilitate understanding and avoid unnecessary repeated descriptions, the following specific embodiments are used to describe how the procedures of interaction among the MDC module, the IO routing module, and the OSD node described in and the functions implemented in the embodiments of the present disclosure are executed in the system shown in FIG. 5. Based on all the embodiments of the present disclosure, a person skilled in the art may understand that the system shown in FIG. 5 may be adapted to implement cases described in other various embodiments, all of which fall within the recorded and disclosed scope of the present disclosure.

Embodiment 1

The processor is adapted to: be connected to the memory and read the instruction in the memory, where the instruction includes the instruction used for executing the functions of the MDC module, the IO routing module, and the OSD node; and enable, according to the instruction, the processor to execute the following operations:

enabling the MDC module to: determine that an OSD node in the system is a faulty OSD node, determine a partition on the faulty OSD node, update a partition view of a partition group that includes the partition on the faulty OSD node, and send an updating notification to a primary OSD node on which the partition group in the updated partition view is located, so that the primary OSD node processes, according to the updated partition view, replication of data corresponding to an IO request.

It should be noted that in the foregoing embodiment, the functions of the foregoing MDC module, the IO routing module, and the OSD node may be implemented by one host. In this case, the instruction for implementing the functions of the foregoing MDC module, the IO routing module, and the OSD node may be stored in a memory of the host, and a processor of the host reads the instruction for implementing the functions of the foregoing MDC module, the IO routing module, and the OSD node from the memory. In another embodiment, the functions of the foregoing MDC module, the IO routing module, and the OSD node may be implemented by multiple hosts in an interactive manner. In this case, the instructions for implementing the functions of the foregoing MDC module, the IO routing module, and the OSD node are stored in memories of the different hosts in a distributed manner. For example, a processor of a host 1 executes a function of the foregoing MDC module, a processor of a host 2 executes a function of the primary OSD node, and a processor of a host 3 executes a function of the IO routing module.

Embodiment 2

The processor is adapted to: be connected to the memory and read the instruction in the memory, where the instruction includes the instruction used for executing the functions of the MDC module, the IO routing module, and the OSD node; and enable, according to the instruction, the processor to execute the following operations:

enabling the IO routing module to: receive an IO request, where the IO request includes a key; determine, according to the key, a partition group to which data corresponding to the IO request belongs, and determine a primary OSD node of the partition group to which the data belongs; add IO view version information of an IO view of the partition group to which the data belongs to the IO request, and send, to the determined primary OSD node, the IO request that carries the IO view version information;

enabling the primary OSD node to: receive the IO request; execute the IO request after determining, according to the IO view version information, that an IO view version in the IO request is consistent with a locally stored IO view version; generate a replication request that carries the IO view version information; and send the replication request to a secondary OSD node of the partition group to which the data belongs; and enabling the secondary OSD node to: receive the replication request, and execute the replication request after determining, according to the IO view version information, that an IO view version in the replication request is consistent with an IO view version locally stored on the secondary OSD node, so that data corresponding to the IO request on the secondary OSD node keeps consistent with data corresponding to the IO request on the primary OSD node.

Likewise, in the foregoing embodiment, the functions of the foregoing MDC module, the IO routing module, and the OSD node may be implemented by one host. In this case, the instruction for implementing the functions of the foregoing MDC module, the IO routing module, and the OSD node may exist in a memory of the host, and a processor of the host reads the instruction for implementing the functions of the foregoing MDC module, the IO routing module, and the OSD node from the memory. In another embodiment, the functions of the foregoing MDC module, the IO routing module, and the OSD node may be implemented by multiple hosts in an interactive manner. In this case, the foregoing MDC module, the IO routing module, and the OSD node are stored in memories of the different hosts in a distributed manner. For example, a processor of a host 1 executes a function of the foregoing IO routing module, a processor of a host 2 executes a function of the primary OSD node, a processor of a host 3 executes a function of the secondary OSD node, and a processor of a host 4 executes a function of the MDC module.

Embodiment 3

The processor is adapted to: be connected to the memory and read the instruction in the memory, where the instruction includes the instruction used for executing the functions of the MDC module, the IO routing module, and the OSD node; and enable, according to the instruction, the processor to execute the following operations:

enabling the OSD node to: send a query request to the MDC module after a failback to request an IO view of a partition group that includes a partition on the OSD node, where the OSD node is called a failback OSD node, and the query request carries an OSD identifier of the failback OSD node; receive the IO view returned by the MDC; initiate a data recovery request to a primary OSD in the IO view, to request to recover data updated by the failback OSD node during failure; receive the data that is updated during the failure and that is sent by the primary OSD; and process replication of the IO request according to a partition view that is of the partition group and that is updated by the MDC module after the failback OSD node completes data recovery;

enabling the MDC module to: receive the query request of the failback OSD node, return the IO view to the failback OSD node according to the OSD identifier in the query request, and update the partition view of the partition group after the failback OSD node completes data recovery; and enabling the primary OSD node to: receive the data recovery request of the failback OSD node, send the data updated during the failure to the failback OSD node, and process, according to the partition view that is of the partition group and that is updated by the MDC module after the failback OSD node completes data recovery, replication of data corresponding to the IO request.

Likewise, in the foregoing embodiment, the functions of the foregoing MDC module, the IO routing module, and the OSD node may be implemented by one host. In this case, the instruction for implementing the functions of the foregoing MDC module, the IO routing module, and the OSD node may exist in a memory of the host, and a processor of the host reads the instruction for implementing the functions of the foregoing MDC module, the IO routing module, and the OSD node from the memory. In another embodiment, the functions of the foregoing MDC module, the IO routing module, and the OSD node may be implemented by multiple hosts in an interactive manner. In this case, the foregoing MDC module, the IO routing module, and the OSD node are stored in memories of the different hosts in a distributed manner. For example, a processor of a host 1 executes a function of the foregoing failback OSD node, a processor of a host 2 executes a function of the primary OSD node, a processor of a host 3 executes a function of the MDC module, and a processor of a host 4 executes a function of the IO routing module.

The following uses multiple specific procedure embodiments to further describe connection and interaction, specific functions, and the like of the MDC module 202, the IO routing module 204, and the OSD node 206 in the foregoing distributed storage and replication control system in detail. These specific procedure embodiments include: a procedure of initialized generation and acquisition of a cluster view, an IO request processing procedure, an OSD failure processing procedure, an OSD node failback procedure, a data recovery procedure, a procedure in which an OSD node exits from a cluster after a failure, and a procedure in which a new OSD node joins a cluster, which are described one by one in detail in the following.

It should be noted that not all steps or functions in the following embodiments are necessary; a sequence of the steps is merely for ease of description, and is not particularly limited unless necessarily required according to the principle of the solutions of the present disclosure; in addition, specific implementation manners in the steps are merely used as illustrative examples, and constitute no particular limitation to the protection scope of the present disclosure. Based on the entire specification of the present disclosure, a person skilled in the art may make corresponding addition or deletion or non-creative variation or replacement to the foregoing steps according to an actual situation, and combine different implementation manners in the steps with implementation manners in other steps to form different embodiments, all of which fall within the recorded and disclosed scope of the present disclosure.

Figure 6:
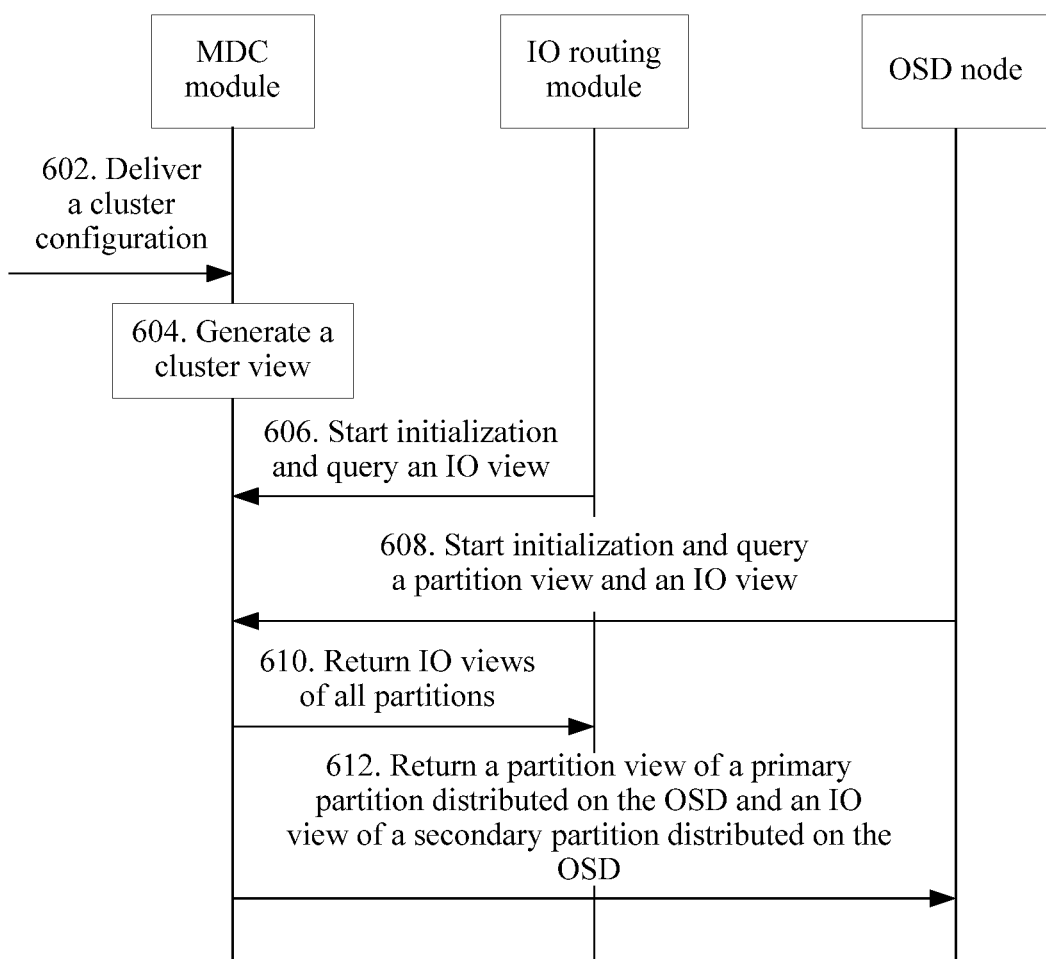
FIG. 6 is a flowchart of view initialization according to an embodiment of the present disclosure.

Procedure of initialized generation and acquisition of a cluster view:

FIG. 6 shows an embodiment of initialized generation and acquisition of a cluster view according to the present disclosure. In this embodiment, an MDC module generates an initial cluster view according to cluster configuration information delivered by an administrator. An IO routing module and an OSD node query the MDC module for the view during initialization. This embodiment is executed by the MDC module, the IO routing module, and the OSD node mentioned in the embodiments described in FIG. 2A to FIG. 2C and FIG. 5.

During system initialization, the MDC module is first started, and then acquiring, by the IO routing module and the OSD node, the view from the MDC is started. A specific process includes the following steps:

602. A user or the administrator delivers the cluster configuration information to the MDC module, where the cluster configuration information may include system configuration parameters such as cluster topology information, a partition quantity, and a replica quantity, and the cluster topology information mainly includes a quantity of servers and their IP addresses, rack information, a quantity of OSD nodes on each server and information about physical storage resources managed by the OSD nodes (for example, local disk information corresponding to the OSD nodes), and the like.

604. The MDC generates the initial cluster view according to the delivered cluster configuration information, where three types of cluster views (an OSD view, a partition view, and an IO view) are already described above; the MDC generates an OSD view according to configured OSD information, generates a partition view by using a partition allocation algorithm, the configured partition quantity, replica quantity, and OSD node quantity, and does not need to additionally generate an IO view, which is a subset of the partition view, where when the partition view is being generated, partition allocation balance (a quantity of partitions on each OSD node keeps the same as much as possible) and security (OSD nodes on which partition replicas exist are in different servers or different racks) generally need to be considered.

606. Start initialization of the IO routing module, and query the MDC module for the IO view, where when being started, the IO routing module needs to acquire a related view from the MDC so as to work normally.

608. Start initialization of the OSD node, and query the MDC module for the partition view and the IO view, where the OSD node needs to acquire a partition view of a partition group that includes a primary partition distributed on the OSD node and an IO view of a partition group that includes a secondary partition distributed on the OSD node.

610. The MDC module returns IO views of all partition groups to the IO routing module.

612. The MDC module returns, to the OSD node, the partition view of the partition group that includes the primary partition distributed on the OSD and the IO view of the partition group that includes the secondary partition distributed on the OSD node.

Figure 7A:
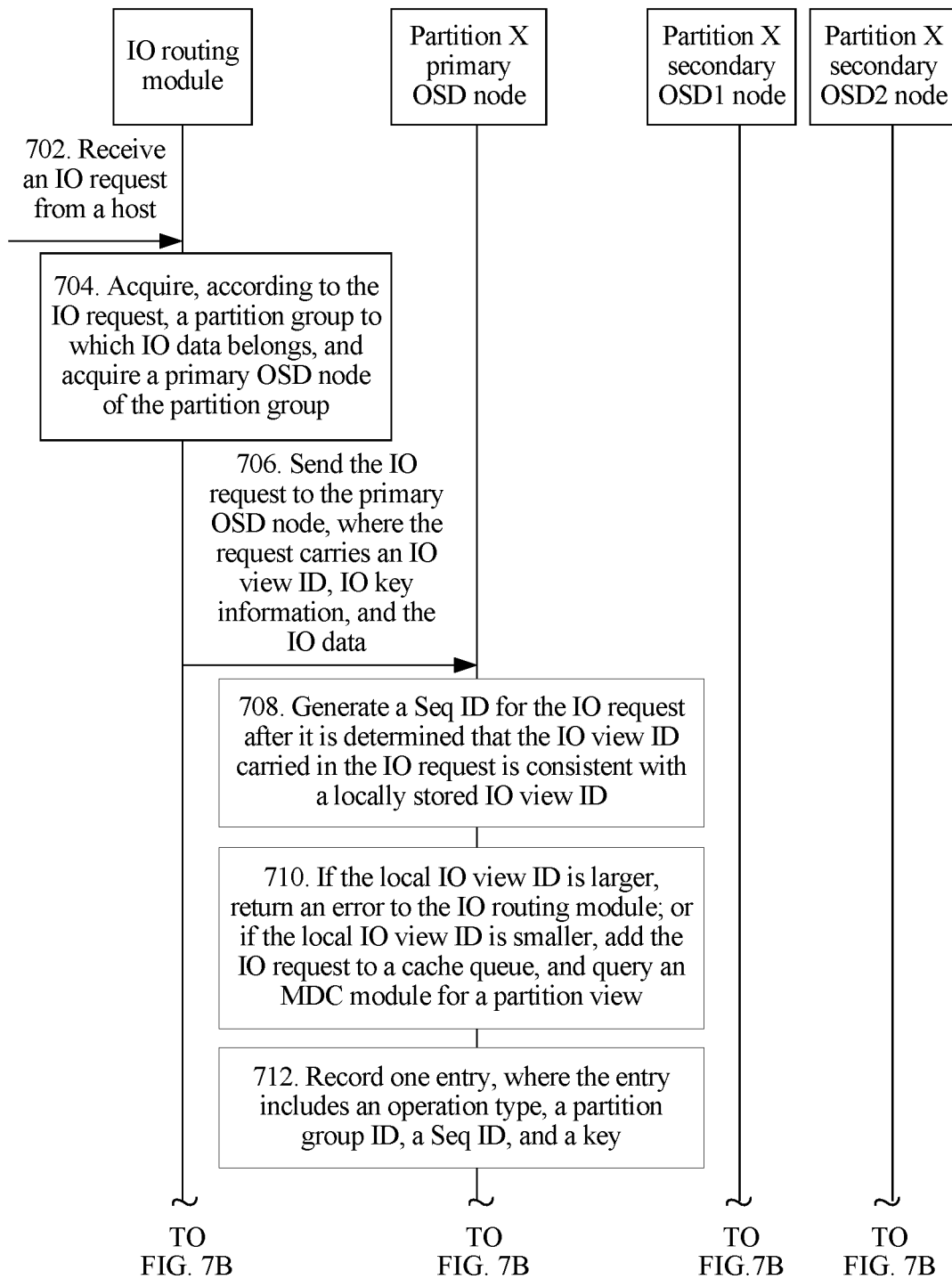
FIG. 7A and FIG. 7B are a flowchart of IO request processing according to an embodiment of the present disclosure.
Figure 7B:
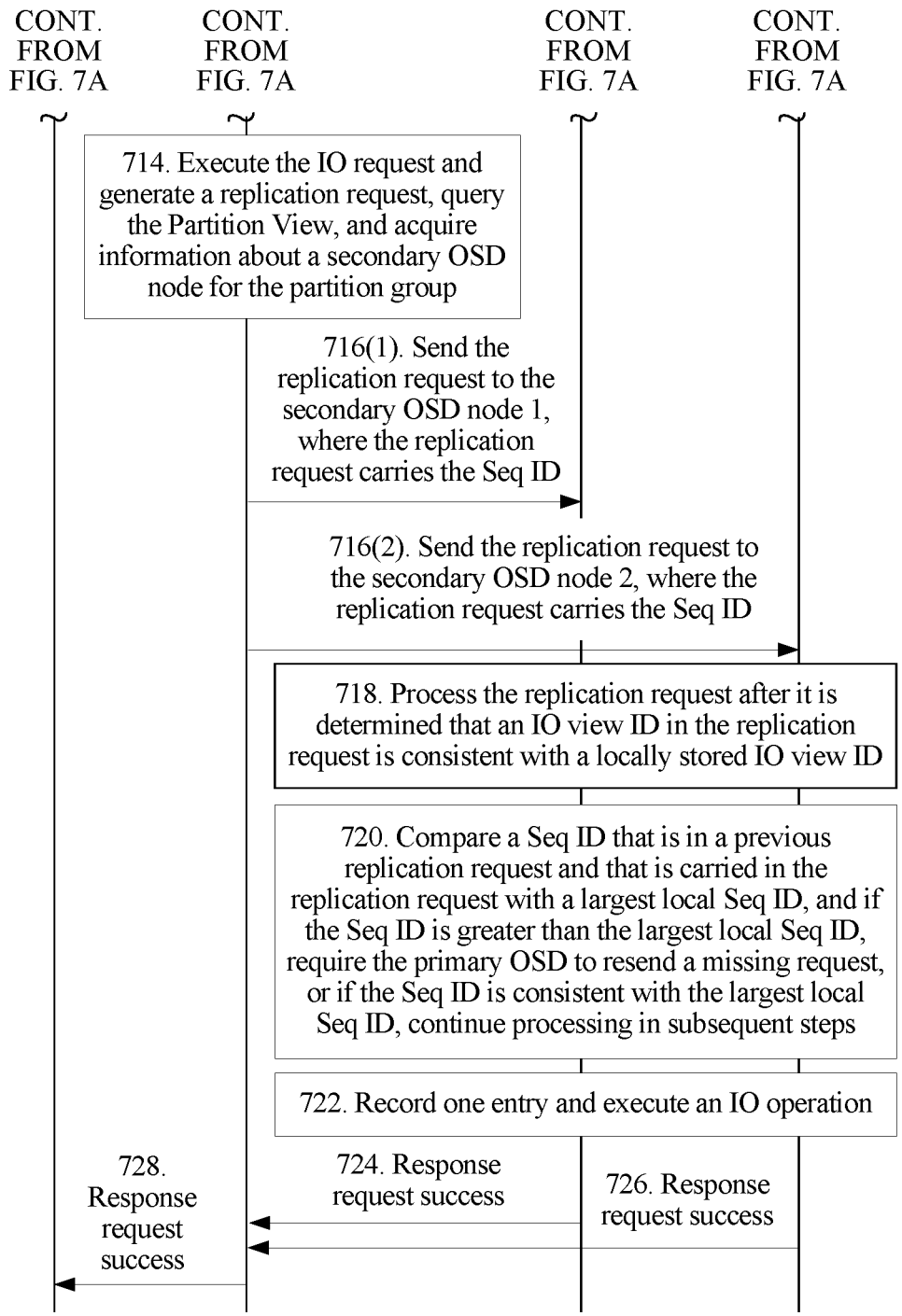

IO request processing procedure:

FIG. 7A and FIG. 7B show an embodiment of an IO request processing procedure according to the present disclosure. This embodiment is executed by the IO routing module and the OSD node mentioned in the embodiments described in FIG. 2A to FIG. 2 C and FIG. 5. To facilitate understanding, a partition group (a Partition X) is used as an example for description in this embodiment, where Partition X may be any partition group managed and maintained by a distributed replication protocol layer in this embodiment of the present disclosure, a primary OSD node on which a primary partition in the partition X is located is abbreviated as a Partition X primary OSD node, a secondary OSD1 node on which a secondary partition in the Partition X is located is abbreviated as a Partition X secondary OSD1 node, and a secondary OSD2 node on which a secondary partition in the Partition X is located is abbreviated as a Partition X secondary OSD2 node. The partition X is used as an example in the following specific description. An IO operation procedure (for example, a write operation or a modify operation) in this embodiment includes the following steps:

702. The IO routing module receives an IO request sent by a host (for example, a server shown in FIG. 2C on which the IO routing module is located).

704. The IO routing module obtains, according to the received IO request, a partition of data (which may also be called IO data) corresponding to the IO request, and acquires a primary OSD node of a partition group that includes the partition.

In a specific implementation manner, the IO routing module may obtain, by means of calculation by using a hash algorithm and according to a key carried in the IO request, a partition group ID of the partition group that includes the data corresponding to the IO request, and then searches for an IO view by using the partition group ID, so as to acquire the primary OSD node of the partition group. As described above, the partition group corresponding to the partition group ID herein is the partition X in this embodiment. The Key is a digit or a character string defined in an upper-layer service, and is used to identify a data block.

706. The IO routing module sends the IO request to the primary OSD node of the partition group, where the request carries IO view version information (for example, an IO view ID), IO key information, and the IO data.

According to the foregoing description, the partition group in this embodiment is the partition X, and accordingly, the IO request is sent to the primary OSD node of the partition X, that is, the partition X primary OSD node. In a specific implementation manner, the IO view ID may also be called an IO view version number, and the IO view version number is mainly used to identify a view version and monotonically increases, where a small IO view ID indicates that a view version maintained by the primary OSD node is an outdated version, and a requirement for ensuring consistency is that views seen by all modules in the IO processing procedure are consistent. The IO key information may include a key, an offset, and a length, where the offset indicates an offset of the IO data relative to a start position in a data block identified by the key, and the length indicates a length of the IO data.

708. Generate a sequence (Seq) ID (which may also be called a sequence identifier) for the IO request after it is determined, according to the IO view version information, that a view version carried in the IO request is consistent with a locally stored view version, where, after determining that the IO view ID carried in the IO request is consistent with a locally stored IO view ID, the primary OSD node generates a sequence identifier for the IO request.

In a specific implementation manner, the Seq ID includes the view version number and a sequence number (Seq NO). The view version number monotonically increases as the IO view changes, and the Seq NO indicates a serial number of a modify operation (for example, writing and deleting) on data corresponding to a partition group in the IO view within one IO view version. After the IO view changes, the Seq NO in the Seq ID starts to increase again from 0. That the Partition X primary OSD node compares whether the IO view ID carried in the IO request is consistent with the locally stored IO view ID may be: the Partition X primary OSD node first compares the IO view IDs, where a larger IO view ID indicates a larger Seq ID; and if the IO view IDs are equal, then compares Seq NOs, where a larger Seq NO indicates a larger Seq ID, and only when both the IO view IDs and the Seq NOs are the same, it indicates that the Seq IDs are consistent.

710. If the local IO view ID is larger, return an error to the IO routing module; or if the local IO view ID is smaller, add the IO request to a cache queue, and query the MDC module for a partition view.

In a specific implementation manner, after determining that the IO view ID in the IO request is less than the locally stored IO view ID, the Partition X primary OSD node returns the error to the IO routing module, and the IO routing module queries the MDC module for the IO view of the partition group, and resends the IO request after obtaining an updated IO view ID; or after determining that the IO view ID in the IO request is greater than the locally stored IO view ID, the Partition X primary OSD node adds the IO request to the cache queue, and queries the MDC module for an IO view ID of the IO view of the partition group, so as to execute the IO request after determining that the locally stored IO view ID is consistent with the IO view ID in the IO request.

712. Record one entry, where the entry includes an operation type, a Partition group ID, a Seq ID, and a key.

In a specific implementation manner, the operation type may include writing, deleting, or the like. For a write operation, the entry may further include the foregoing offset and length. In addition, for various types of operations, the entry may further include status information, which is used to describe whether the operation is successful. Generally, all modify operations (such as write and delete operations) on a same partition group are consecutively numbered.

714. Execute the IO request, and query a partition view of the partition group to obtain information about a secondary OSD node of the partition group.

In a specific implementation manner, if the executing the IO request is writing the IO request, the IO data is written to local physical storage resources (for example, a cache layer or a persistence layer show in FIG. 2C, such as a magnetic disk, or the foregoing mentioned external physical storage resources SAN) managed by the Partition X primary OSD node; and if the IO request is a delete request, corresponding data on the local physical storage resources managed by the Partition X primary OSD node is deleted. In a specific embodiment, the Partition X primary OSD node further generates a replication request. In specific implementation, the replication request may be a replication request generated by separately assembling a control part of the IO request, so that data corresponding to the IO request on the secondary OSD node of the Partition X is consistent with data corresponding to the IO request on the Partition X primary OSD node.

716(1)/(2). Separately send a replication request to the partition X secondary OSD1 node and the partition X secondary OSD2 node, where the replication request carries the Seq ID.

In a specific implementation manner, the replication request may further include the information such as the key, the offset, the length, and the IO data in the original request. When the replication request is a write replication request, the replication request carries the key, the offset, the length, and the IO data; and when the replication request is a delete replication request, the replication request carries only the key.

718. Process the replication request after it is determined that an IO view ID in the replication request is consistent with a locally stored IO view ID.

In a specific implementation manner, in addition to the foregoing step 718, the procedure may further include the following steps:

After determining that the IO view ID in the replication request is less than the locally stored IO view ID, the Partition X secondary OSD1 node or the Partition X secondary OSD2 returns an error to the Partition X primary OSD node, and the Partition X primary OSD node queries the MDC module for the IO view of the partition group, and resends the replication request after obtaining the updated IO view ID; or after determining that the IO view ID in the replication request is greater than the locally stored IO view ID, the Partition X secondary OSD1 node or the Partition X secondary OSD2 node adds the replication request to the cache queue, and queries the MDC module for the IO view version number of the partition group, so as to execute the replication request after determining that the locally stored IO view ID is consistent with the IO view ID in the IO replication request.

In the existing two-phase commit protocol, if a participant rejects a proposal, an entire IO procedure needs to be rolled back, which causes quite large overheads. However, in this embodiment, if a secondary OSD node rejects a request, a latest view is first queried and then processing continues, and a rollback does not need to be performed, which therefore improves fault tolerance and availability of an entire system.

In the existing two-phase commit protocol, in one normal IO process, message interaction needs to be performed between a coordinator and a participant twice. However, in this embodiment, an IO process needs to be performed only once, and message interaction is performed between a primary node and a secondary node only once, which reduces an IO delay caused by message interaction, and improves efficiency and performance of the entire system.

In a specific implementation manner, the replication request may further carry a Seq ID in a previous replication request sent by the Partition X primary OSD node of the partition X, and the IO procedure may further include step 720.

720. Compare a Seq ID that is in a previous replication request and that is carried in the replication request with a largest local Seq ID, and if the Seq ID is greater than the largest local Seq ID, require the Partition X primary OSD node to send a missing request, or if the Seq ID is consistent with the largest local Seq ID, continue processing in subsequent steps.

The replication request carries the Seq ID that is in the previous replication request, which can prevent data missing caused by a change of the IO view version number. In addition, missing data is sent, which can ensure that sequences in which a primary OSD node and a secondary OSD node execute all IO are consistent, and further improve data backup consistency.

In a specific implementation manner, if the Seq ID that is in the previous replication request and is carried in the replication request is less than the largest local Seq ID, an error is returned to the partition X primary OSD node, and the partition X primary OSD node resends the replication request; or a Seq ID is determined by means of further querying, and after the Seq ID is determined, an updated Seq ID is acquired and then processing continues, instead of directly returning an error. In the two cases, processing does not need to be terminated for a rollback, which further improves the fault tolerance and availability of the system and the performance of the entire system.

When IO operations need to be executed by both the primary OSD node and the secondary OSD node, it is required to ensure that the sequences in which the primary OSD node and the secondary OSD node execute all the IO operations are consistent, which is a key to ensuring consistency of multiple partition replicas.

722. Record one entry, and execute the replication request.

In a specific implementation manner, the entry includes an operation type, a Partition group ID, a Seq ID, and a key, where the operation type may include writing, deleting, or the like. For a write operation, the entry may further include the foregoing offset and length. In addition, for various types of operations, the entry may further include status information, which is used to describe whether the operation is successful. The executing the replication request includes: when the replication request is a write replication request, the replication request carries the key, the offset, the length, and the IO data; and when the replication request is a delete replication request, the replication request carries only the key.

724/726. The partition X secondary OSD1 node and the partition X secondary OSD2 node separately send a response request success message to the partition X primary OSD node.

728. The partition X primary OSD node sends the response request success message to the IO routing module.

Based on the foregoing IO request embodiment, assuming that in a process of processing the IO request, the partition X primary OSD node or the partition X secondary OSD node becomes faulty (for example, after the IO request arrives at the partition X primary OSD node, the partition X primary OSD node becomes faulty, or the partition X secondary OSD node becomes faulty), a new OSD node joins the system as a secondary OSD node of the partition X, or the like, in these cases, the IO request processing procedure in the foregoing embodiment may further include a processing process described in the following embodiment.

When the partition X primary OSD node becomes faulty after the IO request arrives at the partition X primary OSD node, the IO processing procedure includes the following:

after the partition X primary OSD node becomes faulty, the MDC module in the system sets, when detecting, in the process of processing the IO request, that the partition X primary OSD node becomes faulty, the partition X primary OSD node in the partition view of the partition group as a new partition X secondary OSD node, and marks a partition status of the new partition X secondary OSD node as inconsistent; sets the partition X secondary OSD1 node in the partition view of the partition group as a new partition X primary OSD node, and sends the updated partition view of the partition group to the new partition X primary OSD node; and sets the partition X secondary OSD1 node in the IO view of the partition group as a new partition X primary OSD node, and sends the updated IO view of the partition group to the IO routing module;

the IO routing module receives the updated IO view that is of the partition group and that is sent by the MDC module, and sends the IO request to the new partition X primary OSD node according to the updated IO view of the partition group; and the new partition X primary OSD node is adapted to: receive the IO request, and after executing the IO request, generate a replication request, and send the new replication request to another secondary OSD node in the updated partition view of the partition group, where steps of generating the replication request and sending the replication request are the same as the foregoing steps 714 and 716.

When the partition X secondary OSD node becomes faulty after the IO request arrives at the partition X primary OSD node, the IO processing procedure includes the following:

after the partition X secondary OSD node becomes faulty, the MDC module is further adapted to: when detecting, in the process of processing the IO request, that the partition X secondary OSD node becomes faulty, mark a partition status of the partition X secondary OSD node in the partition view as inconsistent, and send the updated partition view of the partition group to the partition X primary OSD node; and the primary OSD node is adapted to: after receiving the updated partition view of the partition group, send the replication request to another secondary OSD node whose partition status is consistent in the updated partition view, and skip sending the replication request to the partition X secondary OSD node whose partition status is inconsistent.

In the two-phase commit protocol, if a coordinator becomes faulty, IO processing is interrupted, and continues only when the coordinator returns to normal. In this embodiment, after a primary OSD node becomes faulty, the MDC module can rapidly determine a new primary OSD node by means of voting, and rapidly resume IO processing, and therefore high availability and strong fault tolerance are achieved.

In addition, in the two-phase commit protocol, if a participant becomes faulty or continuously has no response, another IO request is continuously blocked and finally fails due to a timeout, and a rollback needs to be performed. In this embodiment, if a secondary node becomes faulty, the MDC instructs a primary node to make a view alteration, so as to isolate or ignore the faulty OSD node, and continue IO request processing without blocking processing on the another IO request, which has better fault tolerance, and can rapidly handle a node failure and perform a node failback. For example, a failure of N replicas in N+1 replicas may be tolerated, which further improves performance and availability of a storage system. A system with low availability inevitably has poor extensibility, and because a storage node failure is common in a large-scale distributed storage system, complex and massive protocol interaction may further reduce system extensibility.

In addition, an influence range of the storage node failure can be greatly narrowed down by means of control of a cluster view at a partition granularity, so that the storage system can be extended on a large scale, and the system extensibility is improved.

After the IO request arrives at the partition X primary OSD node, the MDC finds that a new OSD node joins the cluster and serves as a secondary OSD node of the partition X, and the IO processing procedure includes the following:

the MDC module notifies, when determining, in the process of processing the IO request, that the new OSD node joins a cluster, the partition X primary OSD node that the new OSD node serves as a new secondary OSD node on which the partition X is located; after partition data synchronization is completed, updates a partition view and an IO view of the partition group; and instructs the partition X primary OSD node to update a partition view locally stored on the partition X primary OSD node; and the partition X primary OSD node synchronizes data of a primary partition on the partition X primary OSD node to the new secondary OSD node, and sends the replication request to the new secondary OSD node according to the updated locally stored partition view.

OSD failure processing procedure:

A storage node failure is common in a large-scale distributed storage system. When some OSD nodes are faulty, the system needs to be capable of normally providing an IO service. In this embodiment of the present disclosure, processing on all IO requests depends on a cluster view maintained by an MDC module, and when an OSD node in a cluster becomes faulty, the cluster view also needs to be updated accordingly, so that an IO request can be properly and effectively processed.

To prevent the OSD node failure from affecting proper processing on replication of the IO request, the following processing generally needs to be performed: First, the MDC module detects a status of an OSD node, and when an OSD node becomes faulty, the MDC module can find the failure in time; second, after finding the OSD failure, the MDC module needs to perform processing in time to make a correct alteration to the view, and notify a related IO routing module and OSD node of the alteration; third, the related IO routing module and OSD node process a corresponding IO request according to the updated view after receiving an updating notification of the MDC, so that the module and the node can obtain the updated view in time, thereby ensuring that the IO request is smoothly and effectively processed.

The MDC module may detect the OSD node failure in the following two modes: (1) The MDC module is responsible for failure detection on all OSD nodes, and each OSD node regularly sends a heartbeat message to the MDC module, where if an OSD node does not send a heartbeat message to the MDC module within a specified time period, the MDC module determines that the OSD node becomes faulty; and (2) OSD nodes regularly send a heartbeat message to each other to detect a failure, where if a detecting party does not receive a heartbeat message of a detected party within a specified time period, the detecting party reports to the MDC module that a corresponding OSD node becomes faulty.

As described above, both a partition view and an IO view are described in terms of a partition group, and generally, there are multiple partitions on an OSD node. A failure of one OSD node relates to view updating for multiple partition groups that include the multiple partitions, and view updating for all the partition groups are mutually independent:

(1) when a partition on the faulty OSD node includes a secondary partition, a partition status of the faulty OSD node in a partition view of a partition group that includes the secondary partition is marked as inconsistent; at the same time, a primary OSD node of the partition group is notified of an updated partition view, and the primary OSD node of the partition group processes, according to the updated partition view, replication of data corresponding to an IO request; and (2) when a partition on the faulty OSD node includes a primary partition, the faulty OSD node that serves as a primary OSD node in a partition view of a partition group that includes the primary partition is set as a new secondary OSD node, a partition status corresponding to the new secondary OSD node is marked as inconsistent, a secondary OSD node whose partition status is consistent is selected from an original secondary OSD node in the partition view of the partition group that includes the primary partition, and the selected secondary OSD node is set as a new primary OSD node; and then the new primary OSD node is notified of partition view updating, and another secondary OSD node is notified of IO view updating, where if the primary OSD of the partition group becomes faulty and partition statuses of OSD nodes on which all secondary partitions are located are inconsistent, no alteration is made to the partition view and an IO view; it is required to ensure that a primary partition replica has latest complete data, thereby ensuring data replication consistency.

That the related IO routing module and OSD node process a corresponding IO request according to the updated view after receiving an updating notification of the MDC may include:

the new primary OSD node replicates, according to the updated locally-stored partition view, the data corresponding to the IO request from the IO routing module onto a secondary OSD node whose partition status is consistent in the updated locally stored partition view, or onto a secondary OSD node on which a partition whose partition status is inconsistent is located in the updated locally-stored partition view but that is recovering data, so as to isolate the failure, and ensure proper and uninterrupted IO request processing, thereby improving fault tolerance of the system, and accordingly improving performance and availability of the system. In addition, an influence range of the OSD node failure can be narrowed down by means of control of a cluster view at a partition granularity, so that the system can be extended on a large scale, and system extensibility is improved.

Finally, after the faulty OSD node completes a failback and data recovery, the MDC module further updates the partition view and the IO view, notifies a primary OSD node on which a partition in the further updated partition view is located of the further updated partition view, and sends the further updated IO view to a secondary OSD node on which a partition in the further updated partition view is located, so that the module or the OSD node that receives the further updated partition view or IO view updates a locally stored partition view or IO view, and processes, according to the further updated partition view or IO view, replication of the data corresponding to the IO request.

The view is updated in time, so that the failback node can rapidly join the cluster to process the IO request, which improves the performance and efficiency of the system.

Figure 8A:
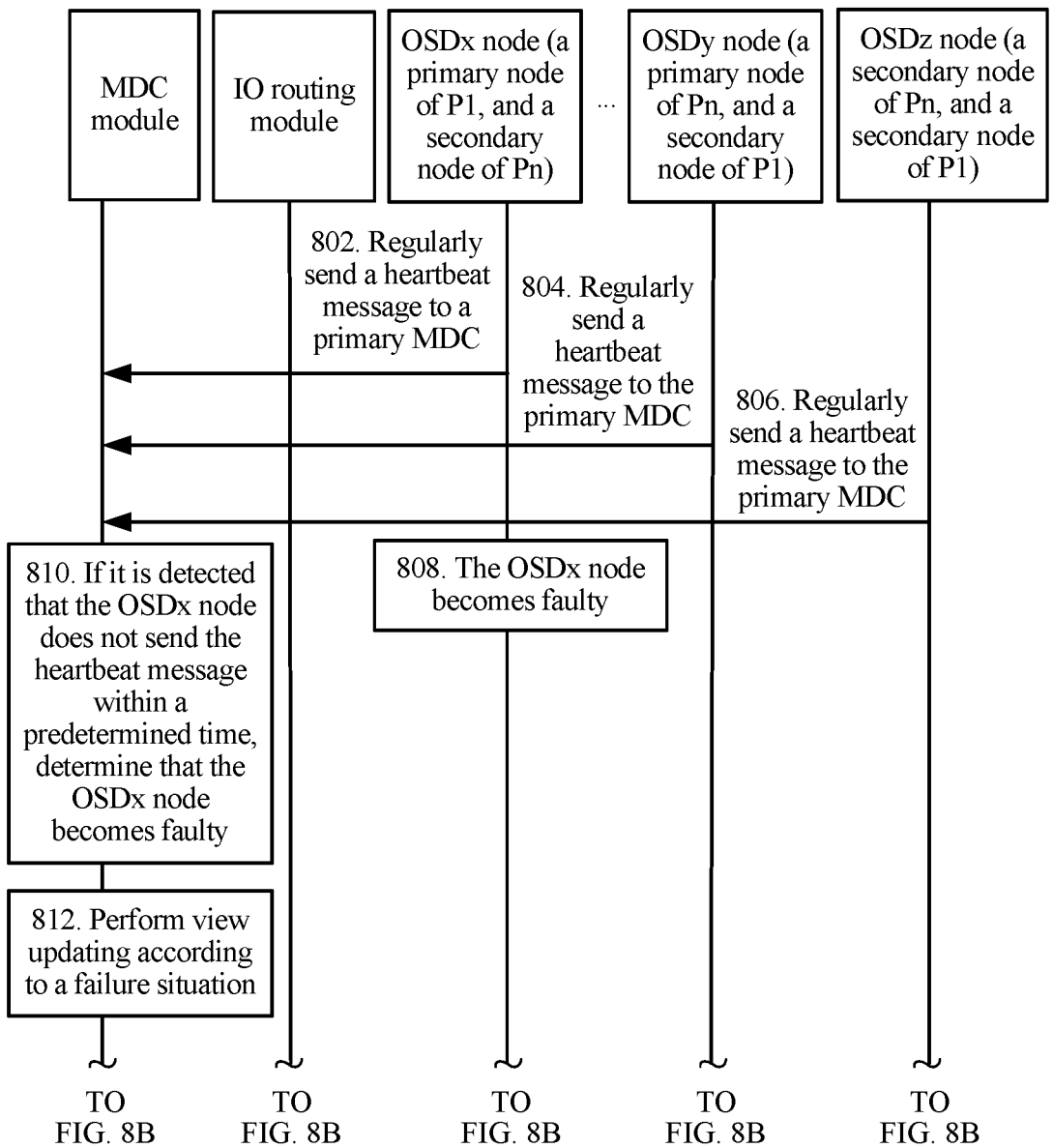
FIG. 8A and FIG. 8B are a flowchart of OSD failure processing according to an embodiment of the present disclosure.
Figure 8B:
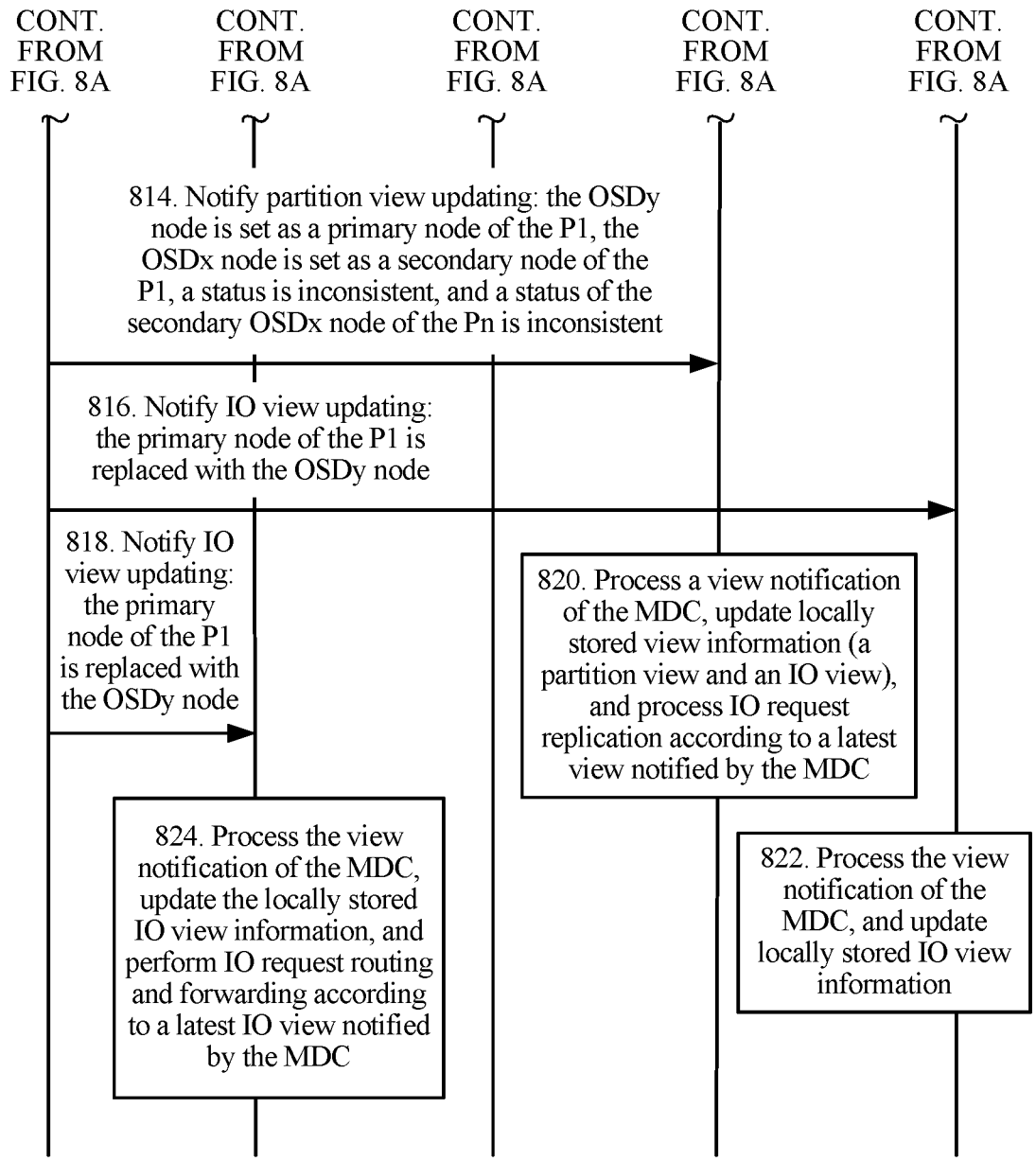

To facilitate understanding, the following uses a specific embodiment for description. FIG. 8A and FIG. 8B show an embodiment of an OSD node failure processing procedure according to the present disclosure. This embodiment is executed by the MDC module, the IO routing module, and the OSD node mentioned in the embodiments described in FIG. 2A to FIG. 2C and FIG. 5. To facilitate understanding, an OSDx node, an OSDy node, and an OSDz node among OSD nodes in this embodiment are used as an example for description, where the OSDx node, the OSDy node, or the OSDz node may be any one OSD node of multiple OSD nodes in a distributed replication protocol layer in this embodiment of the present disclosure. In addition, to facilitate understanding, in this embodiment, it is assumed that the OSDx node is a primary OSD node of a partition group 1 (P1 for short) and a secondary OSD node of a partition group n (Pn for short); the OSDy node is a primary OSD node of the Pn and a secondary OSD node of the P1; and the OSDz node is a secondary OSD node of the Pn and a secondary OSD node of the P1. The OSD node failure processing procedure in this embodiment includes the following steps:

802/804/806. The OSDx node, the OSDy node, and the OSDz node separately and regularly send a heartbeat message to the MDC module.

808. The OSDx node becomes faulty.

In an actual application, there may be various software, hardware, or network faults. For example, because of a program process restart caused by a software BUG a temporary network disconnection, a server restart, and the like, the OSD node cannot process the IO request, and cannot implement data storage and replication functions.

810. If the MDC module detects that the OSDx node does not send the heartbeat message within a predetermined time, the MDC module determines that the OSDx node becomes faulty.

In an actual application, as described above, the MDC may also determine, in another manner, that the OSDx node becomes faulty. For example, a functional OSD node notifies the MDC module that an OSD node becomes faulty.

812. The MDC module performs view updating according to a failure situation.

In a specific implementation manner, the MDC updates a cluster view of a corresponding partition group according to a partition group that includes a partition on the determined faulty OSD node. In this embodiment, partition groups that include a partition on the faulty OSDx node include the P1 and the Pn, and therefore, the MDC needs to update cluster views of the P1 and the Pn, which may include:

(1) Update an OSD view: A status of the OSDx node is updated from an "IN" and "UP" state to an "IN" and "DOWN" state.

(2) Alter a partition view: For the P1, the OSDy node is set as a primary OSD node of the P1 (the first secondary OSD node whose partition status is consistent is selected from a secondary OSD node list of the P1, and is set as a primary OSD node of the partition group), the OSDx is set as a secondary OSD node of the P1, and a corresponding partition status thereof is updated to "inconsistent"; for the Pn, a partition status of the secondary OSDx of the Pn is changed to inconsistent.

(3) Update an IO view: For the P1, the original OSDx node is replaced with the OSDy node as a primary OSD node in an IO view of the P1; for the Pn, because the faulty OSDx node serves as merely a secondary OSD node of the Pn, and the primary OSDy node of the Pn does not become faulty, an IO view of the Pn is not updated.

814. Notify the OSDy node (which serves as a primary OSD node of the P1 after updating and still serves as a primary OSD node of the Pn) of updating of partition views of the P1 and the Pn, where the updating includes: setting the OSDy node as a primary OSD node of the P1, setting the OSDx as a secondary OSD node of the P1 and a corresponding partition status of the OSDx to "inconsistent", and changing a partition status of the secondary OSDx node of the Pn to "inconsistent".

816. Notify the OSDz node of updating of an IO view of the P1, that is, notify the OSDz node that the primary OSD node of the P1 is replaced with the OSDy node.

818. Notify the IO routing module of updating of the IO view of the P1, that is, notify the IO routing module that the primary OSD node of the P1 is replaced with the OSDy node.

820. The OSDy node processes a notification of the MDC module, updates locally stored view information (a partition view and an IO view), and processes, according to a latest view notified by the MDC module, replication of the data corresponding to the IO request.

In a specific implementation manner, as the primary OSD node of the P1 after updating, the OSDy node updates a partition view and an IO view of the P1; as the original OSD node of the Pn, the OSDy node updates a partition view of the Pn.

For an IO operation on the P1, after receiving the IO request forwarded by the IO routing module, the OSDy node executes the IO request, generates a replication request, and sends the replication request to the secondary OSD node of the P1 in the updated partition view, that is, the OSDz node, where a corresponding partition status of the OSDz node is "consistent". Because the OSDx node serves as a new secondary OSD node of the P1, and a partition status of the OSDx node is "inconsistent", the OSDy node no longer sends the replication request to the OSDx node, which implements failure isolation, and does not affect continuous IO request processing on the P1.

For an IO operation on the Pn, after receiving the IO request forwarded by the IO routing module, the OSDy node executes the IO request, generates a replication request, and sends the replication request to the secondary OSD node of the Pn in the updated partition view, that is, the OSDz node, where a corresponding partition status of the OSDz node is "consistent". Because the OSDx node serves as a secondary OSD node of the Pn, and a partition status of the OSDx node is "inconsistent", the OSDy node no longer sends the replication request to the OSDx node, which implements failure isolation, and does not affect continuous IO request processing on the P1.

In the two-phase commit protocol, if a participant becomes faulty or continuously has no response, another IO request is continuously blocked and finally fails due to a timeout, and a rollback needs to be performed. In this embodiment, if a secondary OSD node becomes faulty, the MDC instructs a primary node to make a view alteration, so as to ignore the faulty node, isolate the faulty node, and continue IO request processing without blocking processing on the another IO request, which has better fault tolerance and availability.

822. Process a view notification of the MDC module, and update locally stored IO view information.

824. Process the view notification of the MDC module, update the locally stored IO view information, and perform IO request routing and forwarding according to a latest IO view notified by the MDC module.

In a specific implementation manner, for IO processing on the P1, if the original primary OSDx node of P1 becomes faulty in an IO processing process of the P1, the MDC updates the partition view of the P1 in time, and the IO routing module forwards, according to the newly selected primary OSDy node of the P1 in the updated partition view, the IO request to the newly selected OSDy node again.

In this embodiment of the present disclosure, after a primary OSD node becomes faulty, the MDC node can rapidly determine a new primary node by means of voting, and rapidly resume IO processing, and if a secondary node becomes faulty, the MDC instructs the primary node to make a view alteration, so as to isolate or ignore the faulty OSD node, and continue IO request processing without blocking processing on another IO request, which has better fault tolerance, and can rapidly handle a node failure. For example, a failure of N replicas in N+1 replicas may be tolerated, which further improves performance and availability of a storage system. A system with low availability inevitably has poor extensibility, and because a storage node failure is common in a large-scale distributed storage system, complex and massive protocol interaction may further reduce system extensibility. In addition, an influence range of the storage node failure can be greatly narrowed down by means of control of a cluster view at a partition granularity, so that the storage system can be extended on a large scale, and the system extensibility is improved.

OSD node failback procedure:

A new data modify operation may occur during a failure of an OSD node, and therefore, before the faulty OSD node returns to normal and rejoins a cluster to provide a service, data recovery and synchronization need to be first performed, so as to make a partition replica on the faulty OSD node return to a state consistent with that of a primary replica.

In an embodiment of the present disclosure, the OSD node failback procedure may be divided into three phases:

(1) A secondary OSD node synchronizes, with a primary OSD node, data modification performed by the primary OSD node during the failure, which is an incremental synchronization process, and certainly, in an actual application, all data of a partition may be synchronized according to an actual situation.

(2) After the secondary OSD node returns to a state consistent with that of the primary OSD node, an MDC module alters a cluster view.

(3) The MDC module notifies each module and node of the updated cluster view, so that each module and node process IO request replication or forwarding according to the notified updated cluster view.

In an actual application, if the primary OSD node sends a replication request to the failback node after receiving an IO request in a data recovery process, the OSD node failback procedure may further include the following phase:

The secondary OSD node plays back a log that is recorded after the replication request of the primary OSD node is received and in a process of synchronizing data with the primary OSD, and writes data that is in the log. In this way, it can be ensured that in a failback process, all data of the failback OSD node is consistent with that of the primary OSD node, thereby further improving data consistency between the primary OSD node and the secondary OSD node.

For a specific procedure of a data synchronization process, refer to a specific embodiment provided in the following FIG. 10A and FIG. 10B.

A cluster view updating and updating notification process may include the following cases:

(1) If the OSD node is a secondary OSD node of a partition group before the failure, only a partition view may be altered, where a partition status of the secondary OSD node corresponding to the partition view is changed to a "consistent" state, and the altered partition view is notified to the primary OSD node.

(2) If the OSD node is a primary OSD of a partition group before the failure, both a partition view and an IO view are altered, the OSD node is set as a new primary OSD node of the partition group, the current primary OSD is set as a secondary OSD node of the partition group, the new primary OSD node is instructed to alter the partition view, and an IO routing module and the secondary OSD node are instructed to alter the IO view.

In an actual application, if the faulty OSD node does not return to normal within a specified time period, the MDC module kicks the OSD node out of the cluster, and migrates a partition distributed on the OSD node to another OSD node. For a specific procedure, refer to a specific embodiment in which an OSD node exits from a cluster provided in the following FIG. 11A and FIG. 11B.

Figure 9A:
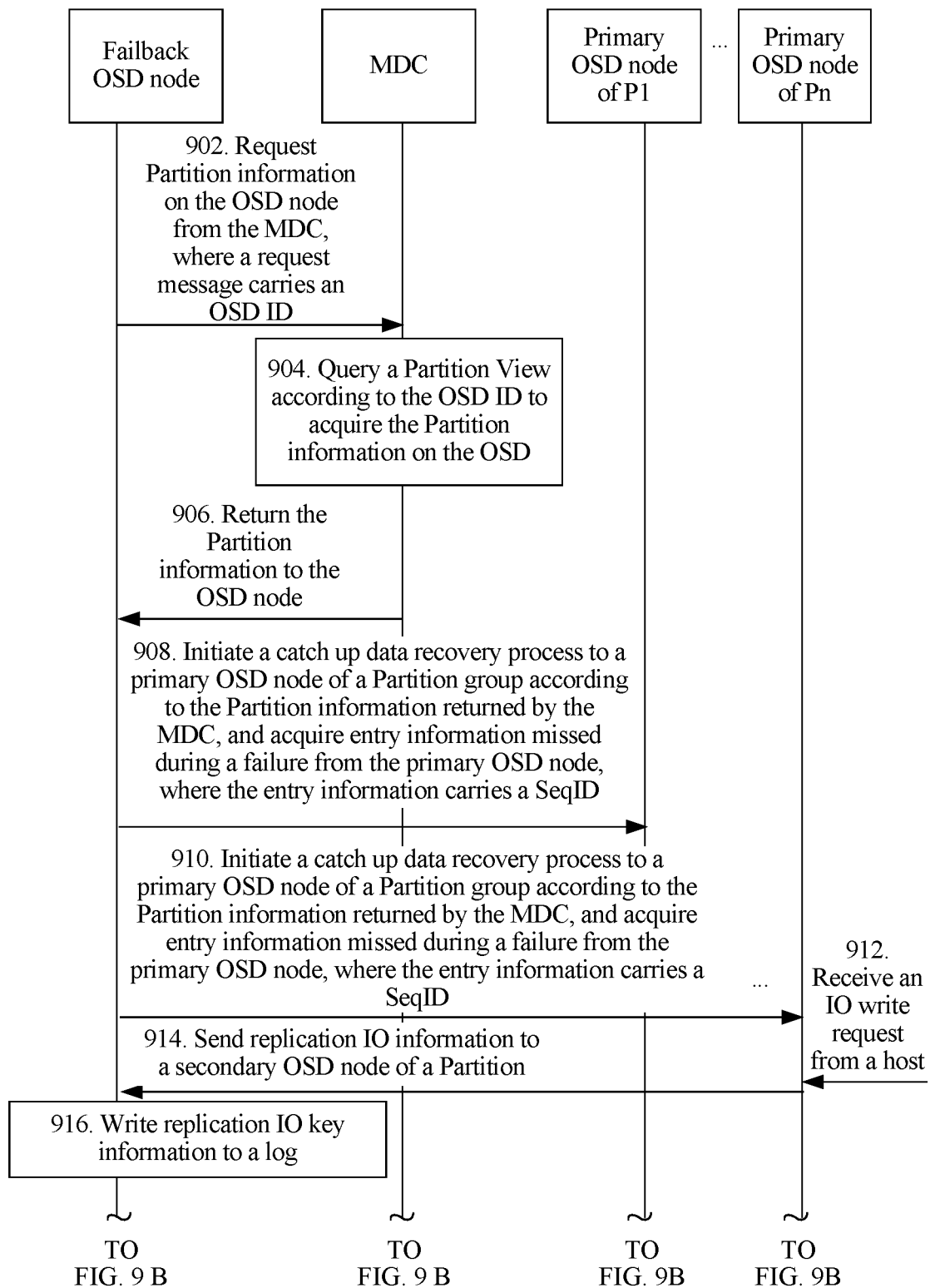
FIG. 9A, FIG. 9B, and FIG. 9C are a flowchart of OSD failback processing according to an embodiment of the present disclosure.
Figure 9B:
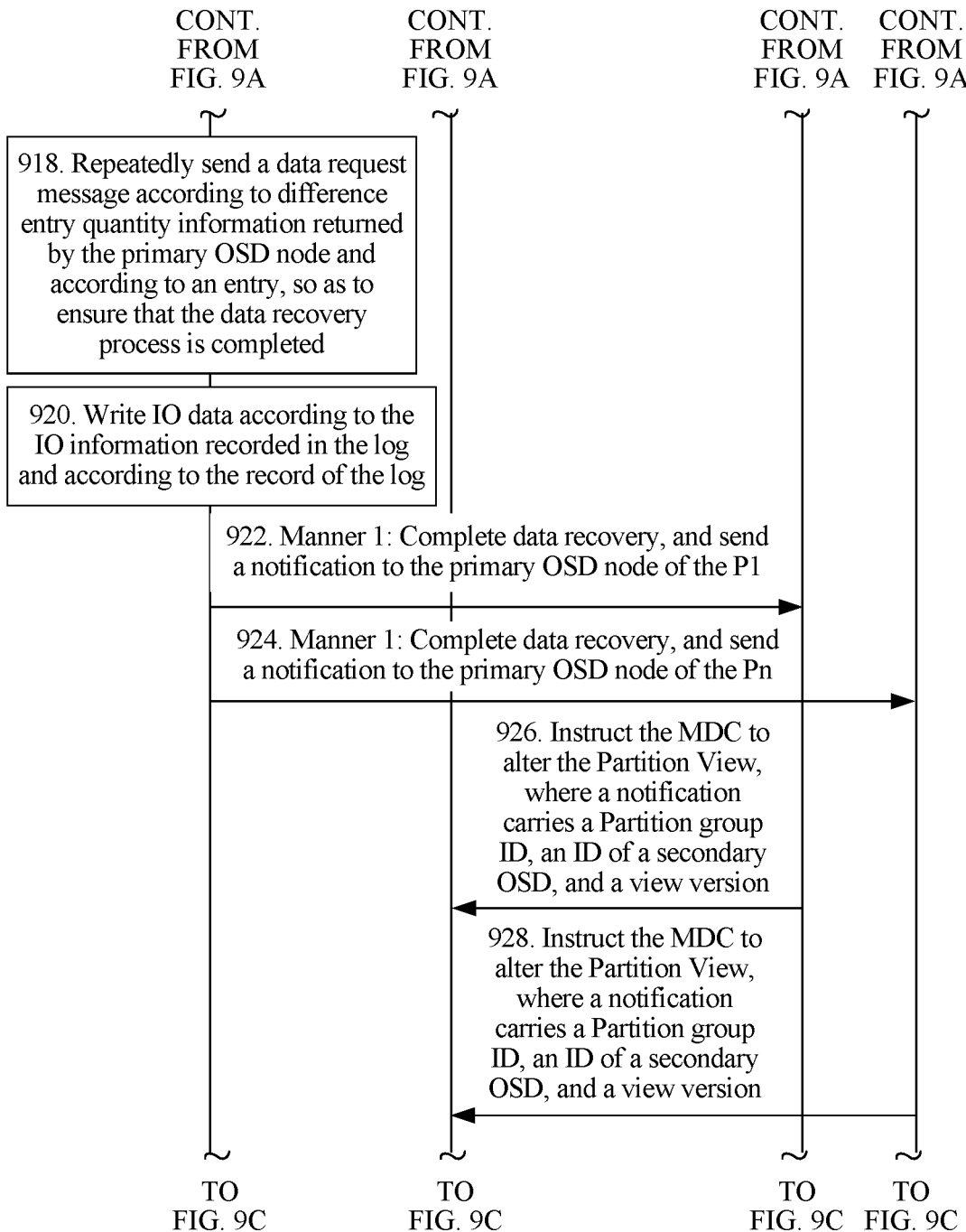
Figure 9C:
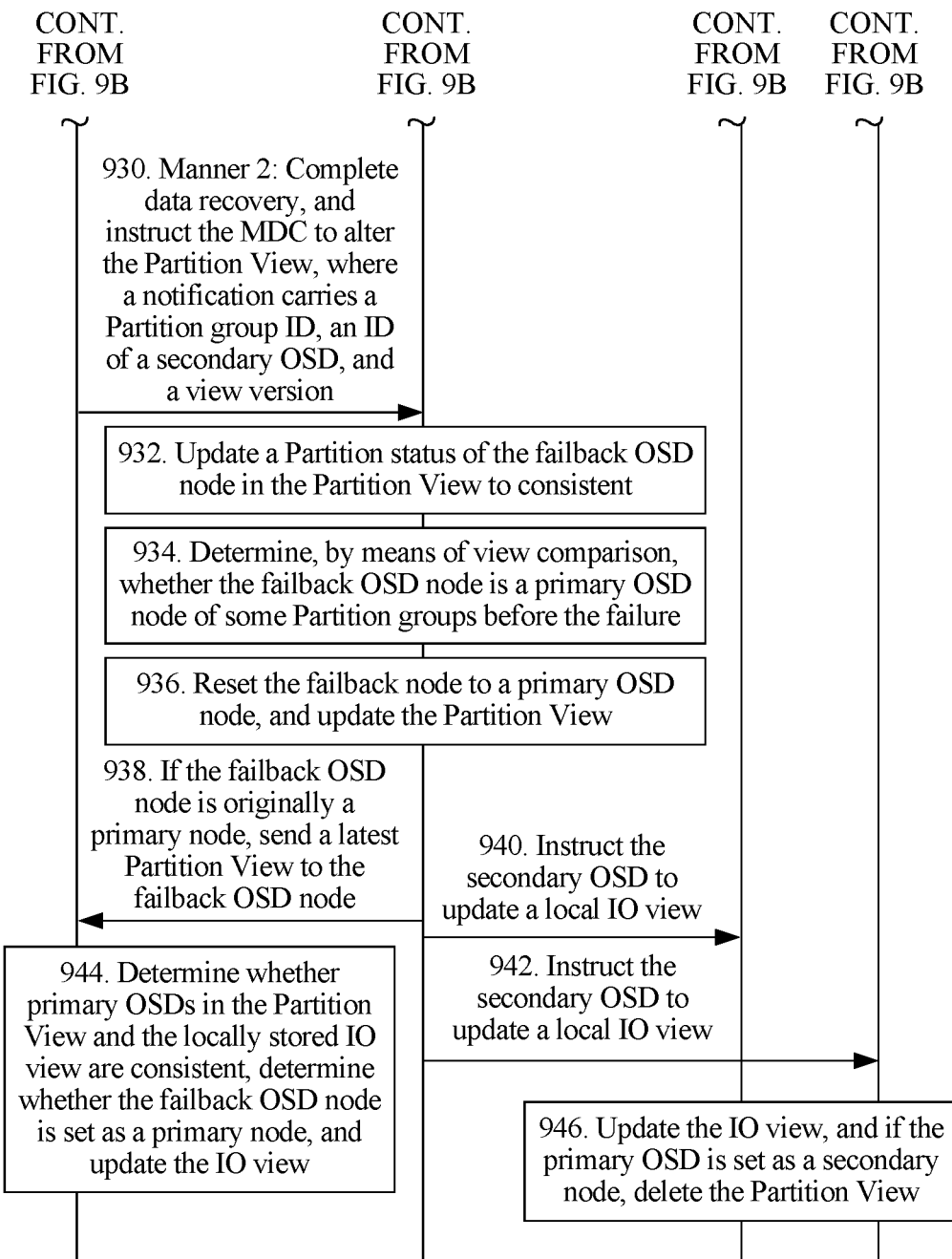

To facilitate understanding, the following uses a specific embodiment for description. FIG. 9A, FIG. 9B, and FIG. 9C show an embodiment of an OSD node failback processing procedure according to the present disclosure. This embodiment is executed by the MDC module, the IO routing module, and the OSD node mentioned in the embodiments described in FIG. 2A to FIG. 2C and FIG. 5. To facilitate understanding, it is assumed in this embodiment that an example in which a partition group that includes a partition on the failback OSD node includes a partition group 1 (P1 for short) and a partition group n (Pn for short) is used for description, and the OSD node failure processing procedure in this embodiment includes the following steps:

902. The failback OSD node requests the MDC module for cluster view information on the failback OSD node, where the request carries an OSD ID of the OSD node.

For a specific implementation manner, refer to the foregoing process described in step 608 in FIG. 6.

904. The MDC module queries a partition view according to the OSD ID to acquire partition information on the OSD.

In a specific implementation manner, the MDC separately queries, according to the OSD ID of the failback OSD, partition views corresponding to the P1 and the Pn on the failback OSD, to separately obtain partition information of the P1 and partition information of the Pn. The partition information may include an IO view, and may further include a partition status.

906. Return the partition information to the OSD node.

908/910. Initiate a data recovery process to a primary OSD node of the partition group according to the partition information returned by the MDC, and separately acquire entry information missed during a failure from primary OSD nodes of the P1 and the Pn, where the entry information carries a Seq ID.

In a specific embodiment of the present disclosure, if a primary OSD node (for example, the primary OSD node of the Pn) receives an IO write request in the failback process, the primary OSD node needs to send a replication request to all secondary OSD nodes of the Pn, and the failback procedure may further include the following steps 912-916 and step 918.

912. The primary OSD node of the Pn receives an IO write request from a host during a failback.

914. Send replication IO information to a secondary OSD node on which a Partition is located.

In a specific implementation manner, for the foregoing steps 912-914, refer to the foregoing IO operation procedure in FIG. 7A and FIG. 7B.

916. Write replication IO key information to a log (log).

In a specific implementation manner, data corresponding to the IO request may also be written to the log, and for the IO key information in this step, refer to the description of the foregoing IO operation procedure in FIG. 7A and FIG. 7B.

918. Repeatedly send a data request message according to difference entry quantity information returned by the primary OSD node and according to an entry, so as to ensure that the data recovery process is completed.

Figure 11A:
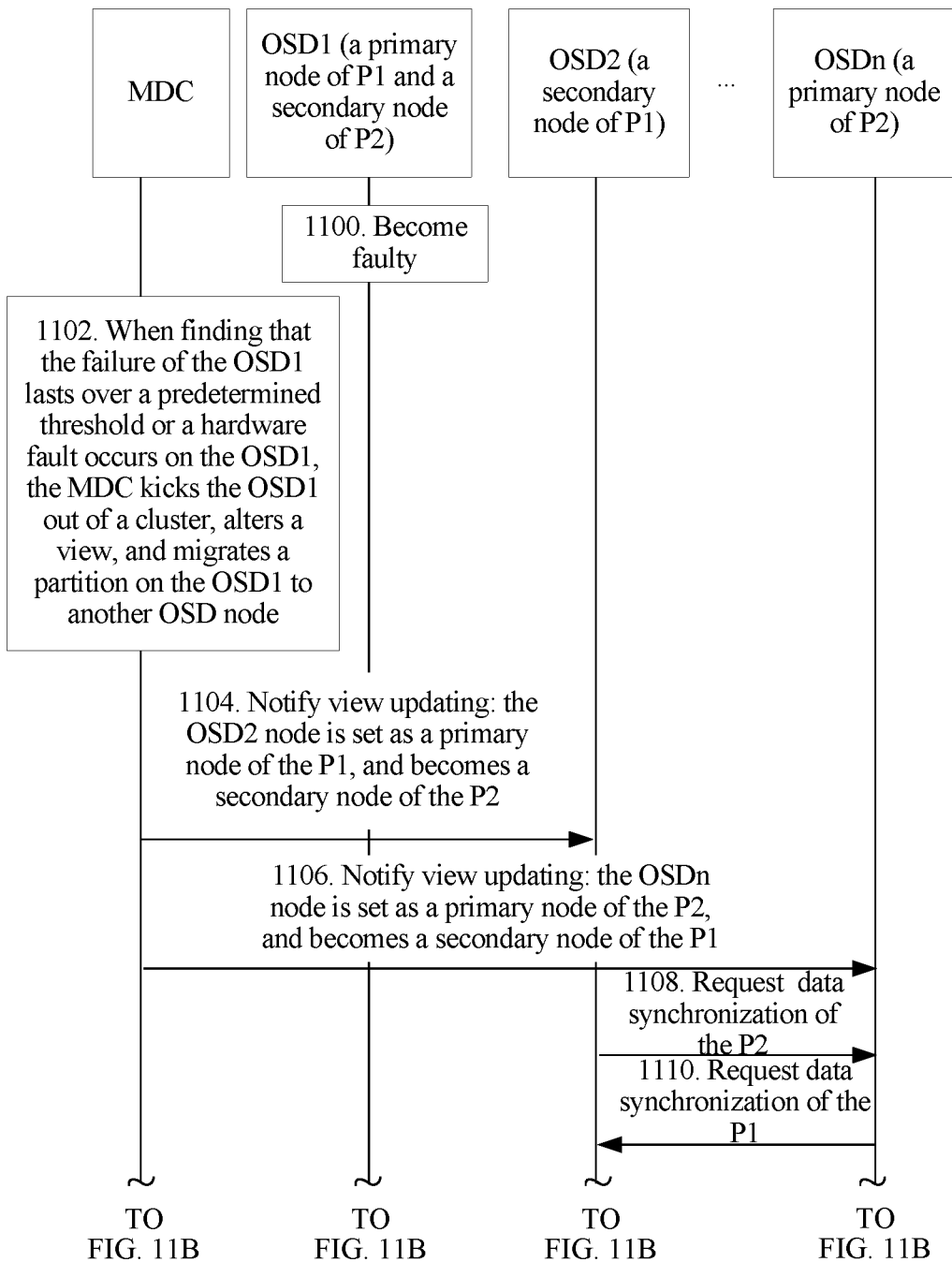
FIG. 11A and FIG. 11B are a flowchart of processing performed after an OSD exits from a cluster according to an embodiment of the present disclosure.
Figure 11B:
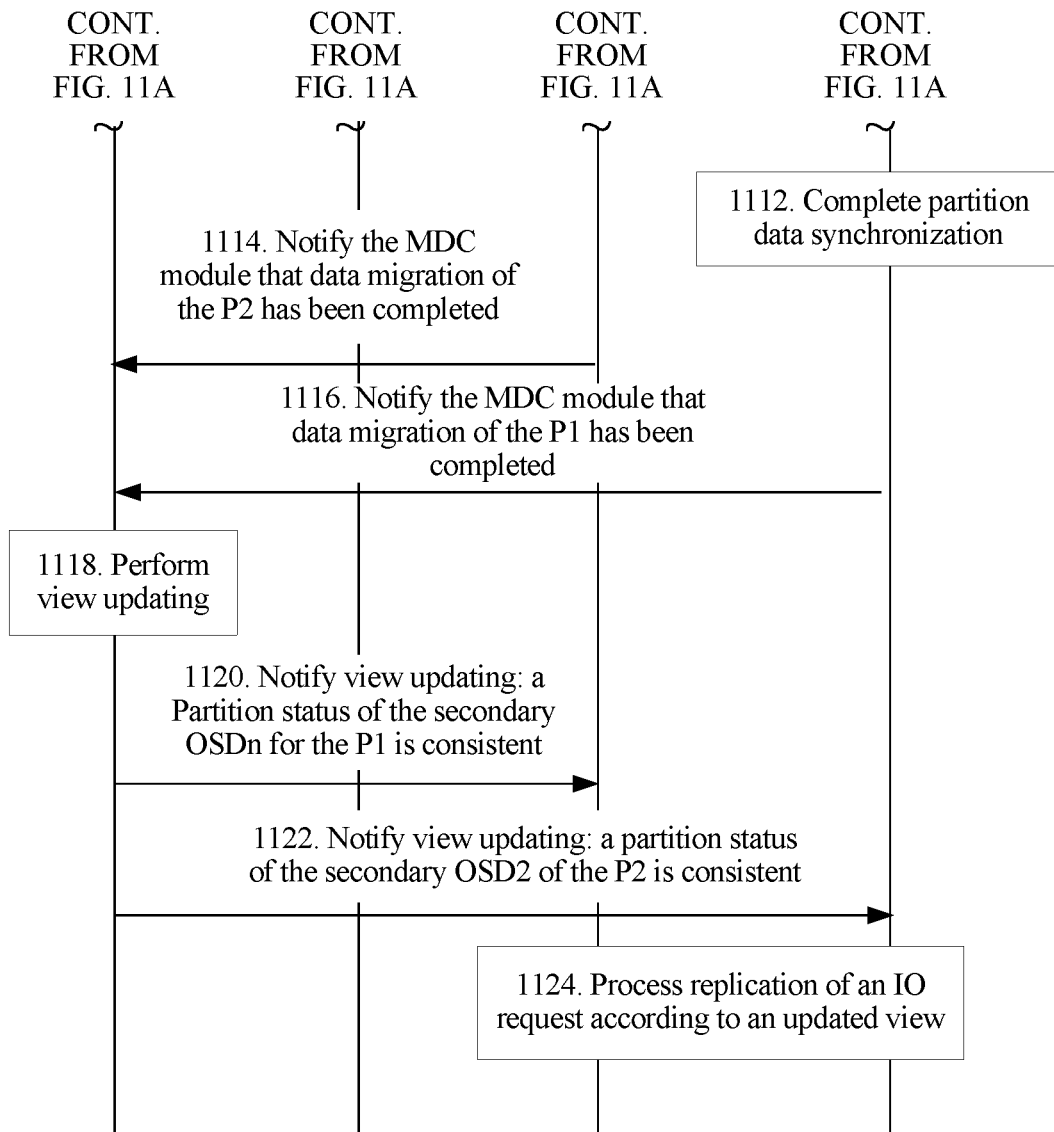

For a specific implementation manner, refer to a data recovery procedure in the following FIG. 11A and FIG. 11B.

920. Write IO according to the IO information recorded in the log and according to the record of the log.

In a specific implementation manner, after completing data recovery and synchronization with the primary OSD node, the failback OSD node writes, to physical storage resources managed by the failback OSD node and according to the IO information recorded in the log, data corresponding to the replication request from the primary OSD of the Pn.

The IO request is written to the log in the failback process, and then an IO request generated during the failure is written after data missing during the failure is recovered, which can ensure that sequences in which the primary OSD node and the secondary OSD node execute all IO operations are consistent, and further improve data backup consistency.

922/924. Complete data recovery, and separately notify the primary OSD nodes of the P1 and the Pn.

In a specific implementation manner, the MDC module may be instructed, in two manners, to execute updating of a cluster view, where in Manner 1, after data recovery is completed, the failback OSD node notifies the primary OSD nodes of the P1 and the Pn, so that the primary OSD node instructs the MDC node to update the cluster view. For Manner 2, refer to the following step 930.

In an actual application, before instructing to update the cluster view, the failback OSD node may further determine a partition status of the partition on the failback OSD node, and triggers a cluster view updating procedure after determining that the partition status is inconsistent. The failback OSD node may further acquire partition status information by gathering the partition information returned in the foregoing step 906.

926/928. The primary OSD nodes of the P1 and the Pn separately instruct the MDC to alter the partition view, where a notification carries a partition group ID, an ID of a secondary OSD, and a view version.

In a specific implementation manner, the notification is sent to the MDC module to require the MDC module to update the partition status of the partition on the failback OSD node to consistent, where the notification carries the partition group ID of the partition group that includes the partition on the OSD node, the ID of the secondary OSD node (that is, the failback OSD node), and the view version. The partition group ID herein is used to mark a to-be-updated view of the partition group, the OSD ID is used to mark the faulty OSD node, and the view version herein is a view version of a latest partition view locally stored on the primary OSD nodes of the P1 and the Pn, where a function of the view version is that the MDC performs cluster view updating processing after receiving the notification and determining that the view version of the partition view in the notification is consistent with a view version of a latest partition view locally maintained by the MDC, thereby ensuring that cluster views seen by all modules or nodes in the IO processing procedure are consistent, and improving data backup consistency.

In an actual application, if it is determined that the view version of the partition view in the notification is inconsistent with the view version of the latest partition view locally maintained by the MDC, the latest partition view is further sent to the primary OSD nodes of the P1 and the Pn, and after it is determined that primary data and secondary data of the P1 and the Pn are consistent, the cluster view is updated.

928. Instruct the MDC to alter the Partition View, and update a status of the failback OSD node to consistent, where a instruction carries the partition group ID, the ID of the secondary OSD, and the view version.

930. Complete data recovery, and instruct the primary MDC to alter the Partition View, where a notification carries the Partition group ID, the ID of the secondary OSD, and the view version.

In a specific implementation manner, after completing data recovery, the failback OSD node sends the notification to the MDC module, to instruct the MDC module to update the partition status of the partition on the failback OSD node to consistent. A difference between the foregoing Manner 1 and Manner 2 lies in that the view version herein is a partition view version of a latest partition view or an IO view version of a latest IO view locally stored on the failback OSD node (whether the view version is the partition view or the IO view depends on whether the failback OSD node is a primary OSD node or a secondary node before the failure), and after determining, according to the view version in the notification, that the corresponding view version locally maintained by the MDC module is consistent, the MDC module performs cluster view updating processing.

932. Update a partition status of the failback OSD node in the partition View to consistent.

In a specific implementation manner, partition statuses corresponding to the failback OSD node in the partition views of the P1 and the Pn on the failback OSD node are updated to "consistent".

934. Determine, by means of view comparison, whether the failback OSD node is a primary OSD node of some partition groups before the failure.

In a specific implementation manner, it is determined, by comparing latest partition views that are of the P1 and the Pn on the failback OSD node and that are locally maintained by the MDC module with initialized partition views of the P1 and the Pn, whether the failback OSD node is the primary OSD node of the P1; or it is determined, by comparing latest IO views that are of the P1 and the Pn on the failback OSD node and that are locally maintained by the MDC module with initialized IO views of the P1 and the Pn, whether the failback OSD node is the primary OSD node of the P1.

936. Reset the failback node as a primary OSD node, and update the Partition View.

In a specific implementation manner, for the P1, the MDC resets the failback OSD node as a new primary OSD node of the P1, set the current primary OSD node on which the P1 is located as a new secondary OSD node of the P1, and update the partition view of the P1; for the Pn, because the failback OSD node is originally a secondary OSD node of the Pn, for the Pn, a primary/secondary identity change problem of the failback OSD node is not involved.

938. If the failback OSD node is originally a primary node, send a latest Partition View to the failback OSD node.

In a specific implementation manner, because the failback OSD node is originally a primary node of the P1, and the failback OSD node is set as a new primary OSD node of the failback OSD node according to step 937, the updated latest Partition View of the P1 needs to be sent to the new primary OSD node of the failback OSD node, that is, the failback OSD node. Because the failback OSD node is originally not a primary node of the Pn, a latest partition view of the Pn may not be sent to the failback OSD node.

940/942. Instruct the secondary OSD to update a local IO view.

In a specific implementation manner, according to latest partition Views or IO views of the P1 and the Pn, new primary OSD nodes of the P1 and the Pn are separately acquired, the latest IO Views of the P1 and the Pn are respectively sent to the new primary OSD node of the P1 and the primary OSD node of the Pn (because for the Pn, a change of the primary OSD node is not involved, the IO view is still sent to the original primary OSD node of the Pn).

944. The failback OSD node determines whether primary OSDs in the Partition View and the locally stored IO view are consistent, determines whether the failback OSD node is set as a primary node, and updates the IO view.

After receiving the latest partition view, the failback OSD node determines whether primary OSDs in the latest partition View and the locally stored IO view are consistent, determine whether the failback OSD node is set as a primary node, and if the primary OSDs in the latest partition View and the locally stored IO view are consistent, and the failback OSD node is set as a primary node, update the IO view and the locally stored partition view, and process, according to the updated partition view and the updated IO view, replication of data related to the IO request.

946. Update the IO view, and if the primary OSD is set as a secondary OSD, delete the Partition View.

In a specific implementation manner, current primary OSD nodes of the P1 and the Pn (that is, OSD nodes that exist after data recovery is completed and before updating starts) receive the updated IO view, and update respective locally-stored IO views. For the current primary OSD node of the P1, because the current primary OSD node has been set by the MDC module as a new secondary OSD node of the P1, the current primary OSD node of the P1 deletes the locally stored partition view, and processes replication of the IO request according to the updated locally-stored IO view.

In this embodiment of the present disclosure, after an OSD node becomes faulty, an MDC instructs another related node to perform view updating, so as to isolate or ignore the faulty OSD node, continue IO request processing without blocking processing on another IO request, update a view after a node failback, and notify each related node, so that the failback node can rapidly rejoin a cluster again for work, which can rapidly process a node failure and failback, has better fault tolerance, and improve performance and availability of a storage system. A system with low availability inevitably has poor extensibility, and because a storage node failure is common in a large-scale distributed storage system, complex and massive protocol interaction may further reduce system extensibility. In addition, an influence range of the storage node failure can be greatly narrowed down by means of control of a cluster view at a partition granularity, so that the storage system can be extended on a large scale, and the system extensibility is improved.

Data Recovery Procedure:

The following describes a data recovery processing procedure in the foregoing OSD failback processing process in FIG. 9A, FIG. 9B, and FIG. 9C by using a specific embodiment. To facilitate understanding, it is assumed in this embodiment that an example in which a partition group that includes a partition on a failback OSD node includes a partition group 1 (P1 for short) and a partition group n (Pn for short) is used for description. As shown in FIG. 10A and FIG. 10B, the OSD node failure processing procedure in this embodiment includes the following steps:

1002. The failback OSD node locally acquires a largest Seq ID in a recorded entry of each partition.

As shown in step 712 and step 722 in the foregoing embodiment in FIG. 7A and FIG. 7B, an OSD node in a system records one entry for each IO operation on a partition in an IO processing process. As described above, the entry includes an IO operation type, a Partition group ID, a Seq ID, and a key, and the entry may further include status information, which is used to describe whether the operation is successful. In addition, for an IO write operation, the entry may further include the foregoing offset and length. For example, in this embodiment, largest Seq IDs for IO write operations on the P1 and the Pn are separately acquired.

1004/1006. Separately request primary OSD nodes of the P1 and the Pn to acquire an entry that the OSD lacks, where the request carries a partition group ID and a respective largest Seq ID.

Scenario 1: A largest Seq ID of a secondary OSD falls within a range of an entry recorded by a primary OSD.

1008/1010. The primary OSD nodes of the P1 and the Pn separately send entries that the failback OSD node lacks to the failback OSD node.

In a specific implementation manner, if a largest Seq ID of the failback OSD node is 1.6, and a current largest Seq ID of the primary OSD is 1.16, ten corresponding entries with Seq IDs from 1.7 to 1.16 are sent to the secondary OSD, which is merely a given example to facilitate understanding. In an actual application, Seq ID numbering rules or manners may be different, and the primary OSD nodes of the P1 and the Pn may lack different entries.

1012/1014. The failback OSD node repeatedly performs data synchronization according to the entry acquired in the previous step, where the request carries IO key information such as a key, an offset, and a length.

In a specific implementation manner, the failback OSD node sends, according to the acquired entries, data synchronization requests one by one in batches to the primary OSD nodes of the P1 and the Pn, where the request carries the IO key information such as the key, the offset, and the length.

1016. Send corresponding data.

In a specific implementation manner, the primary OSD nodes of the P1 and the Pn send, according to information in the acquired data synchronization request, data corresponding to each entry to the failback OSD node.

Scenario 2: A largest Seq ID of a secondary OSD does not fall within a range of an entry recorded by a primary OSD and is less than a smallest Seq ID of the primary OSD.

1018. Send a smallest Seq ID of the primary OSD and no entry.

In a specific implementation manner, in a case in which the primary OSD node of the Pn determines that the largest Seq ID of the failback OSD node does not fall within the range of the entry recorded by the primary OSD, that is, the largest Seq ID is less than a smallest Seq ID of the primary OSD of the Pn, the smallest Seq ID of the primary OSD of the Pn and no entry are sent to the failback OSD node, which helps the failback OSD node to determine whether the primary OSD node of the Pn does not write data or writes excessive data, to such an extent that data recovery cannot be completed by means of incremental synchronization.

1020. Repeatedly request partition data synchronization, where a request carries the partition group ID.

The failback OSD node requests the primary OSD node of the Pn for synchronization of data of an entire partition, where for example, data of a primary partition on the primary OSD of the Pn in this embodiment is synchronized with data of a secondary partition of the Pn on the failback OSD node, and the request carries the partition group ID. In a specific implementation manner, a volume of data of a partition is generally quite large, so that the data cannot be entirely transmitted by using one request, and in addition, the primary node does not know an IO capability of the failback node, but continuously sends data to the failback OSD node, and the failback node may fail in processing the data; therefore, the primary node sends the data to the failback node only when the failback node requests data synchronization. The failback OSD node repeatedly sends a synchronization request to the primary OSD node of the Pn according to a situation, to synchronize data in an entire partition until all the data in the partition are synchronized. In an actual application, the entire partition may be synchronized in another manner, which is not limited in the present disclosure.

1022. Send data corresponding to one or more keys.

The primary OSD node of the Pn sends, according to a synchronization request sent by the failback OSD node each time, the data corresponding to the one or more keys.

Procedure in which an OSD node exits from a cluster after being faulty:

If an OSD node still cannot return to normal and rejoin a cluster after the failure lasts over a preset time threshold (for example, 5 minutes) or a hardware fault occurs on the OSD node, the faulty OSD node needs to be kicked out of the cluster, so as to ensure data reliability.

Exiting from the cluster by the OSD node is a process of partition redistribution and data migration, where in partition redistribution, balance of each node and replica security need to be considered. IO processing in a data migration process is consistent with processing in a failback procedure and a data recovery procedure; after data migration is completed, a primary replica and a secondary replica reach a consistent state, and a process in which an MDC performs view updating and notification is consistent with view updating processing performed after a failback is completed. A process in which each related OSD node performs replication or forwarding processing on an IO request according to an updated view is also consistent with IO processing performed by each OSD node according to a latest view after a failback is completed.

To facilitate understanding, the following uses a specific embodiment for description. FIG. 11A and FIG. 11B show an embodiment of procedure in which an OSD node exits from a cluster after failure according to the present disclosure. This embodiment is executed by the MDC module, the IO routing module, and the OSD node mentioned in the embodiments described in FIG. 2A to FIG. 2C and FIG. 5. To facilitate understanding, it is assumed that in this embodiment, related OSD nodes are an OSD1 node, an OSD2 node, and an OSDn node, where the OSD1 node is a primary OSD node of a partition group 1 (P1 for short) and a secondary OSD node of a partition group 2 (P2 for short), the OSD2 node is a secondary OSD node of the P1, and the OSDn node is a primary OSD node of the P2. The processing procedure in which an OSD node exits after being faulty in this embodiment includes the following steps:

1100. The OSD1 node becomes faulty.

1102. When the MDC module finds that the failure of the OSD1 lasts over a predetermined threshold or a hardware fault occurs on the OSD1, the MDC kicks the OSD1 out of a cluster, alters a view, and migrates partitions (herein, the partitions are a primary partition of the P1 and a secondary partition of the P2) on the OSD1 node to other OSD nodes, for example, the OSD2 node and the OSDn node in this embodiment.

1104. The MDC module notifies the OSD2 node of view updating: the OSD2 node is set as a primary node of the P1, and becomes a secondary node of the P2.

1106. The MDC module notifies the OSDn node of view updating: the OSDn node is a primary node of the P2, and becomes a secondary node of the P1.

1108. The OSD2 node requests the OSDn node to synchronize data of the P2.

Because the OSDn node is the primary OSD node of the P2, the OSD2 node requests the OSDn node to synchronize data of a primary partition of P2 on the OSDn, so that data of a secondary partition of P2 on the OSD2 is consistent with the data of the primary partition of the P2 on the OSDn. A specific synchronization procedure is similar to a synchronization procedure of data of an entire partition in the foregoing data recovery procedure shown in FIG. 10A and FIG. 10B, and details are not described herein again.

1110. The OSDn node requests the OSD2 node to synchronize data of the P1.

Because the OSD2 node is the original secondary OSD node of the P1, after the OSD1 node becomes faulty, as a new secondary OSD node of the P1, the OSDn node can synchronize data of the P1 only with the OSD2, and the OSDn node requests the OSD2 node to synchronize data of a primary partition of the P1 on the OSD2, so that data of a secondary partition of the P1 on the OSDn is consistent with the data of the primary partition of the P1 on the OSD2.

1112. Complete partition data synchronization.

1114. The OSD2 node notifies the MDC module that data migration of the P2 has been completed.

1116. The OSDn node notifies the MDC module that data migration of the P1 has been completed.

1118. The MDC module performs view updating according to a corresponding notification.

A specific view updating principle is the same as that described in the foregoing procedures, an updating process is the same as that described in the foregoing procedures, and details are not described herein again.

1120. Notify view updating: a partition status of the secondary OSDn node of the P1 is consistent.

1122. Notify view updating: a partition status of the secondary OSD2 node of the P2 is consistent.

1124. The OSD2 node and the OSDn node process, according to a latest view, replication of data corresponding to an IO request.

Procedure in which a new OSD node joins a cluster:

A new node joins a cluster, and a partition that is originally distributed on another OSD node needs to be migrated to the new OSD node that joins the cluster, so as to ensure data distribution balance. A procedure in which a new node joins a cluster mainly relates to data migration, view updating after the data migration, view updating notification, and processing performed by a related OSD node on replication of an IO request according to an updated view.

IO processing in a data migration process is consistent with processing in a failback procedure and a data recovery procedure; after data migration is completed, a process in which an MDC performs view updating and notification is consistent with view updating processing performed after a failback is completed. A process in which each related OSD node processes, according to the updated view, replication of data corresponding to the IO request is also consistent with IO processing performed by each OSD node according to a latest view after a failback is completed.

In a specific embodiment, performing view updating after data migration is completed may include the following: (1) The new node that joins the cluster is still a secondary OSD node of some partition groups, a partition status is consistent, and an original secondary OSD of the partition group is no longer a secondary node of the partition group; (2) The new node that joins the cluster is set as a primary OSD node of some partition groups, and the partition group no longer belongs to an original primary OSD node (the partition group is no longer distributed on the original primary OSD).

Figure 12A:
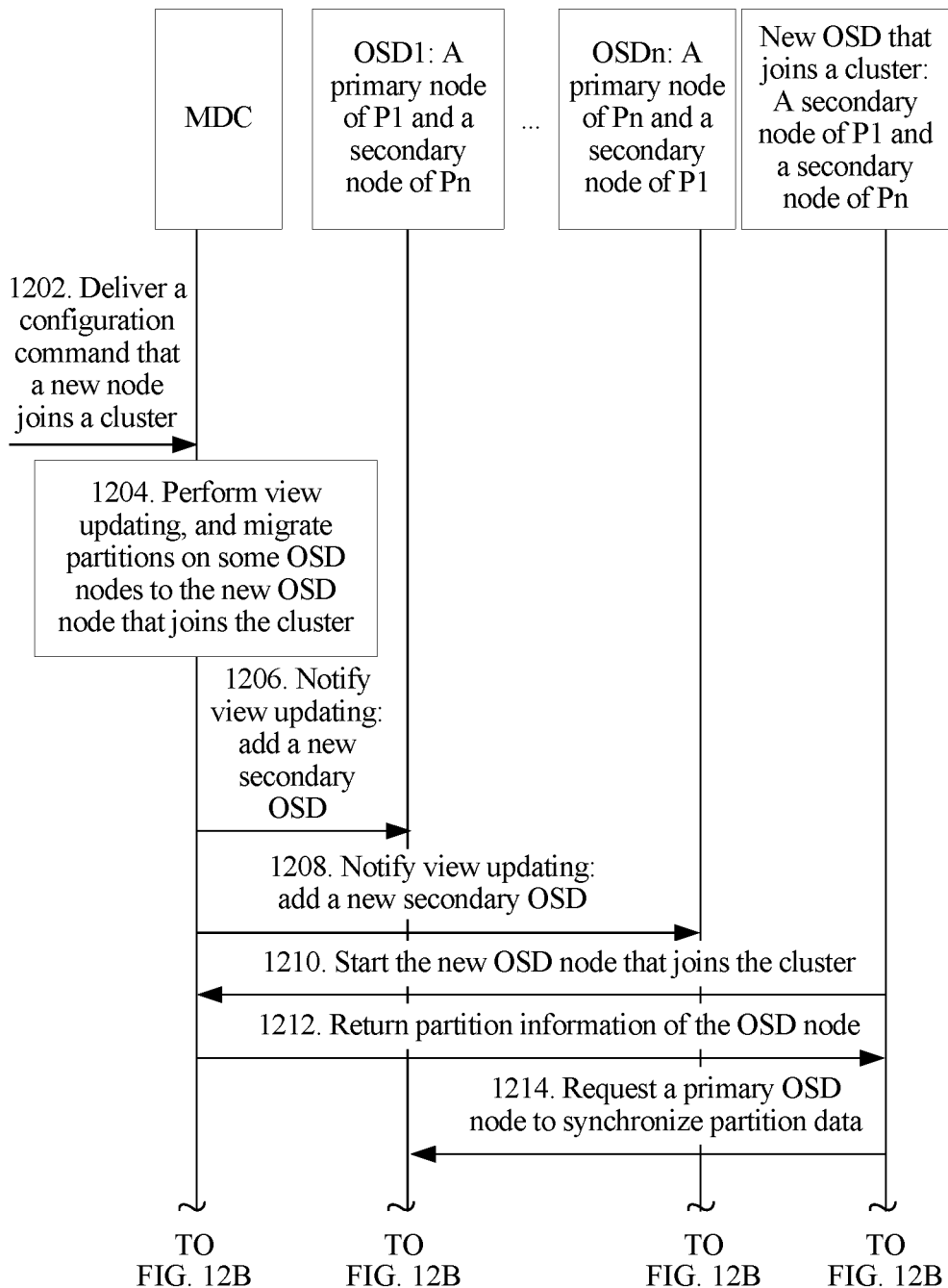
FIG. 12A and FIG. 12B are a flowchart of processing performed after a new OSD joins a cluster according to an embodiment of the present disclosure.
Figure 12B:
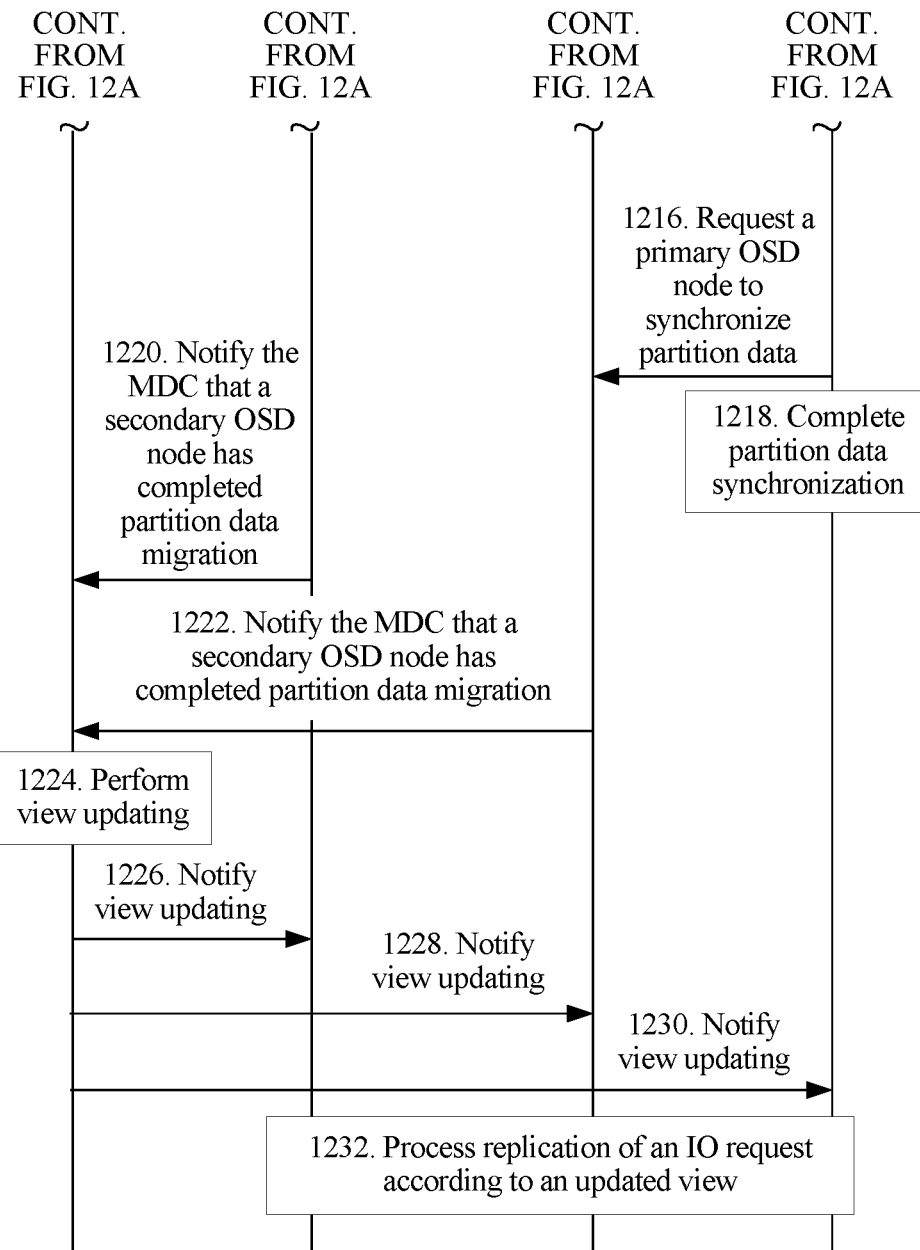

To facilitate understanding, the following uses a specific embodiment for description. This embodiment is executed by the MDC module, the IO routing module, and the OSD node mentioned in the embodiments described in FIG. 2A to FIG. 2C and FIG. 5. To facilitate understanding, it is assumed that in this embodiment, related OSD nodes are an OSD1 node, an OSDn node, and a new OSD node that joins a cluster, where the OSD1 is a primary OSD node of a partition group P1 (P1 for short) and a secondary OSD node of a partition group Pn (Pn for short), the OSDn is a primary OSD node of the Pn and a secondary OSD node of the P1, and the new OSD node that joins the cluster is a secondary OSD node of the P1 and a secondary OSD node of the Pn. As shown in FIG. 12A and FIG. 12B, the procedure in which the new OSD node joins the cluster in this embodiment includes the following steps:

1202. Deliver a configuration command that a new OSD node joins a cluster to the MDC module.

In a specific implementation manner, a system administrator may notify, by using the configuration command, the MDC module that the new OSD node joins the cluster.

1204. The MDC module performs view updating, and migrates partitions on some OSD nodes to the new OSD node that joins the cluster.

In this embodiment, the MDC module migrates a secondary partition of the P1 on the OSD1 node and a secondary partition of the Pn on the OSDn node to the new OSD node that joins the cluster, so that the new OSD node that joins the cluster serves as a new secondary OSD node of the P1 and a new secondary OSD node of the Pn.

1206. Notify the OSD1 node of view updating: add a new secondary OSD.

In a specific implementation manner, the MDC module notifies the OSD1 node of view updating, the new OSD node that joins the cluster is added to a new partition view of the P1 as the secondary OSD node of the P1, and a corresponding partition status is "inconsistent" (because the new OSD node that joins the cluster and the OSD1 node have not synchronized data of the P1 yet).

1208. Notify the OSDn node of view updating: add a new secondary OSD.

In a specific implementation manner, the new OSD node that joins the cluster is added to a new partition view of the Pn as the secondary OSD node of the Pn, and a corresponding partition status is "inconsistent" (because the new OSD node that joins the cluster and the OSDn node have not synchronized data of the Pn yet).

1210. Start the new OSD node that joins the cluster.

In a specific implementation manner, after the new OSD node that joins the cluster joins the cluster as a new OSD node, an initialization process is performed. A specific process is the same as the foregoing procedure of initialized generation and acquisition of a cluster view in FIG. 6, and details are not described herein again.

1212. Return partition information of the OSD node.

In a specific implementation manner, the MDC module returns a view of a partition on the new OSD node that joins the cluster to the new OSD node that joins the cluster, that is, an IO view of the P1 and an IO view of the Pn in this embodiment.

1214. The new OSD node that joins the cluster requests the primary OSD1 node to synchronize partition data.

In a specific implementation manner, the new OSD node that joins the cluster requests, according to the IO view of the P1 returned by the MDC, the primary OSD node of the P1, that is, the OSD1, to synchronize data of the P1, that is, to synchronize data of a primary partition of the P1 on the OSD1 node, so that data of a secondary partition of the P1 on the new OSD node that joins the cluster is consistent with the data of the primary partition of the P1 on the OSD1 node.

Figure 10A:
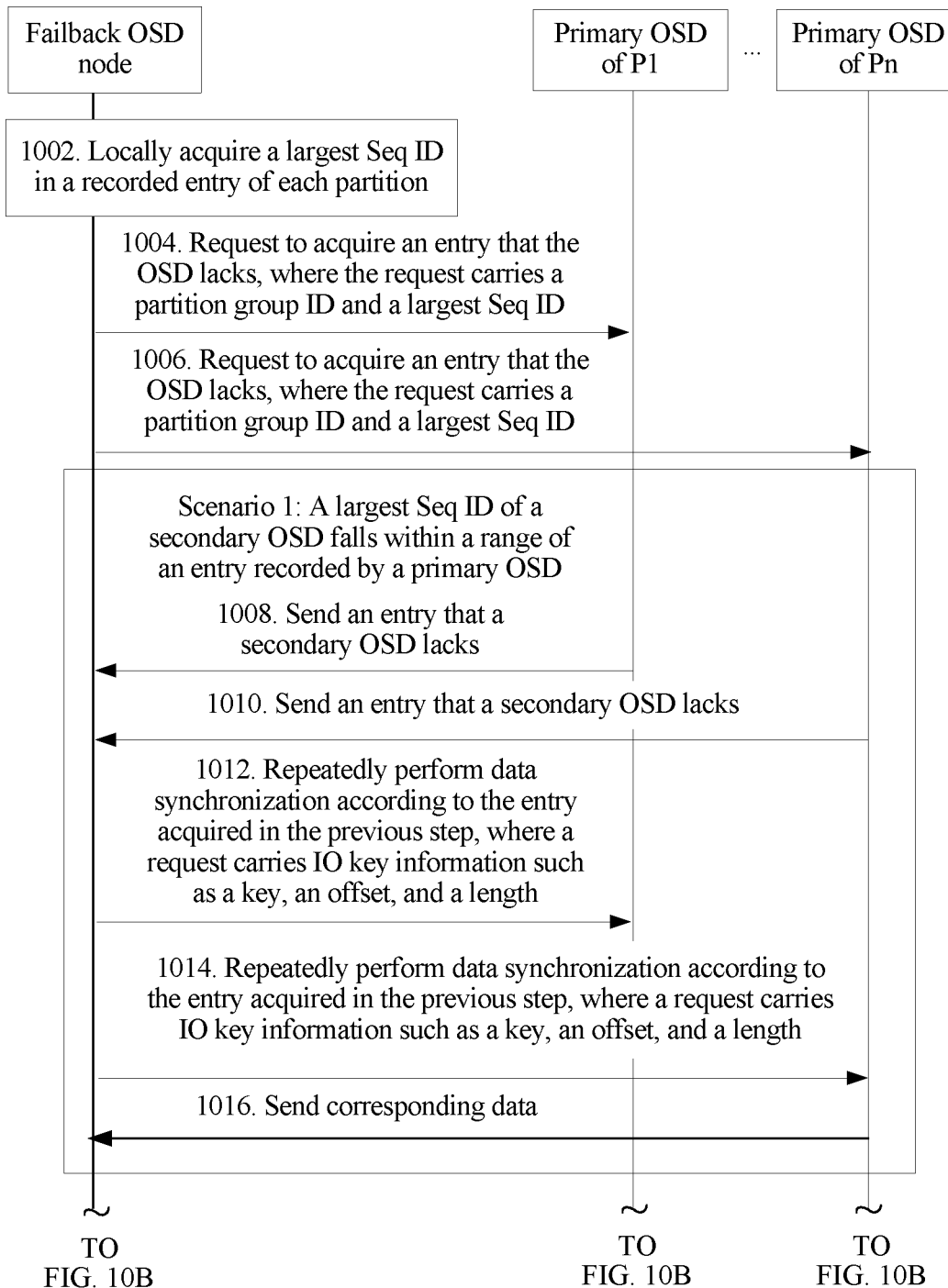
FIG. 10A and FIG. 10B are a flowchart of data recovery in an OSD failback processing process according to an embodiment of the present disclosure.
Figure 10B:
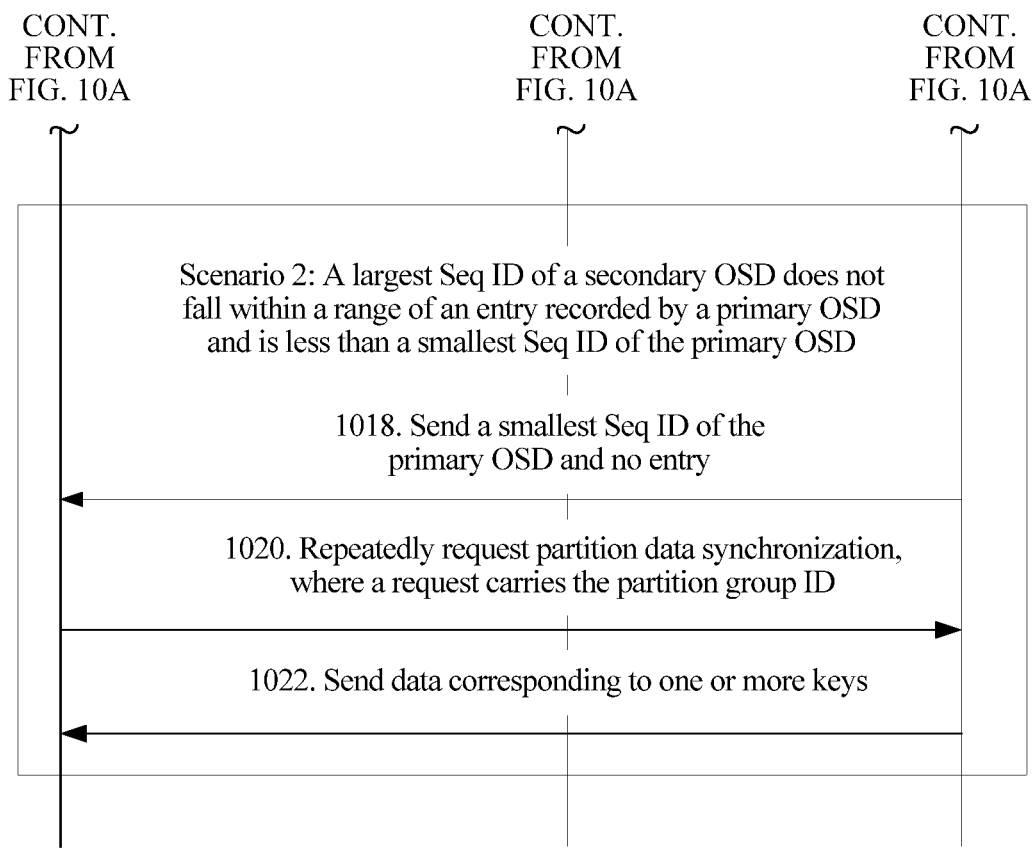

A specific synchronization procedure is similar to a synchronization procedure of data of an entire partition in the foregoing data recovery procedure shown in FIG. 10A and FIG. 10B, and details are not described herein again.

1216. The new OSD node that joins the cluster requests the primary OSDn node to synchronize partition data.

In a specific implementation manner, the new OSD node that joins the cluster requests, according to the IO view of the Pn returned by the MDC, the primary OSD node of the Pn, that is, the OSDn, to synchronize data of the Pn, that is, to synchronize data of a primary partition of the Pn on the OSDn node, so that data of a secondary partition of the Pn on the new OSD node that joins the cluster is consistent with the data of the primary partition of the Pn on the OSDn node.

A specific synchronization procedure is similar to a synchronization procedure of data of an entire partition in the foregoing data recovery procedure shown in FIG. 10A and FIG. 10B, and details are not described herein again.

1218. Complete partition data synchronization.

1220. Notify the MDC that the secondary node has completed partition data migration.

In a specific implementation manner, the OSD1 node notifies the MDC module that the new OSD node that joins the cluster has completed data synchronization of the P1.

1222. Notify the MDC that the secondary node has completed partition data migration.

In a specific implementation manner, the OSDn node notifies the MDC module that the new OSD node that joins the cluster has completed data synchronization of the Pn.

1224. The MDC module performs view updating.

A specific view updating principle is the same as that described in the foregoing procedures, an updating process is the same as that described in the foregoing procedures, and details are not described herein again.

1226-1230. Separately notify the OSD1 node, the OSDn node, and the new OSD node that joins the cluster of view updating.

1232. The OSD1 node, the OSDn node, and the new OSD node that joins the cluster process, according to an updated view, replication of data corresponding to an IO request.

Based on the foregoing descriptions of the embodiments, a person of ordinary skill in the art may understand that all or some of the steps of the methods in the embodiments may be implemented by a program instructing relevant hardware. The program may be stored in a computer-readable storage medium. When the program runs, the steps of the method embodiments are performed. The storage medium is, for example, a ROM/RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A distributed storage system, comprising:
   at least one metadata controller, a plurality of input/output (IO) routers, and a plurality of object-based storage device (OSD) nodes, the metadata controller being configured to:
   establish at least two partitions corresponding to physical storage resources managed by each OSD node, wherein the at least two partitions are primary partitions, secondary partitions, or any combination of primary and secondary partitions, primary and secondary partitions of a combination of partitions constituting a partition group, the primary partition and the secondary partition of a given partition group being located on different OSD nodes, the OSD node on which the primary partition is located being a primary OSD node of the partition group, and the OSD node on which the secondary partition is located being a secondary OSD node of the partition group;

generate a partition view according to the partition, wherein the partition view comprises information about the OSD node on which each partition of the partition group is located;

send the partition view only to a primary OSD node on which a partition in the partition view is located to update a local partition view; and determine existence of a faulty OSD node that is not capable of providing an IO service;

determine a partition on the faulty OSD node upon the determination of the existence of the faulty OSD node, update a partition view of a partition group that comprises the partition on the faulty OSD node, and send an updating notification to a primary OSD node in the updated partition view;

one of the plurality of IO routers being an executing IO router and configured to route a received IO request to an OSD node to execute storage of data corresponding to the IO request; and the primary OSD node being configured to process, according to the updated partition view, replication of the data corresponding to the IO request.

2. The distributed storage system according to claim 1, wherein the partition view comprises an identity and a corresponding partition status of an OSD node on which a partition in a partition group is located, the identity indicating a primary OSD node or a secondary OSD node, the primary OSD node being further configured to update, according to the updated partition view, a partition view locally stored on the primary OSD node; and processing replication of the data corresponding to the IO request comprises:
replicating, according to the updated locally-stored partition view, the data corresponding to the IO request from the executing IO router onto a secondary OSD node whose partition status is consistent in the updated locally-stored partition view, or onto a secondary OSD node whose partition status is inconsistent in the updated locally-stored partition view but that is recovering data.

3. The distributed storage system according to claim 2, wherein the metadata controller is further configured to generate an IO view, wherein the IO view comprises an identifier of a primary OSD node of a partition group, and send the IO view to the executing IO router and the OSD node on which the partition in the partition view is located;

the primary OSD node being further configured to update, according to the updated partition view, an IO view locally stored on the primary OSD node, and process, according to the updated locally-stored IO view, replication of the data corresponding to the IO request.

4. The distributed storage system according to claim 3, wherein
the metadata controller is further configured to update an IO view of a partition group that comprises the primary partition, and notify a secondary OSD node in the updated partition view of the updated IO view; and
the secondary OSD node is configured to update a locally stored IO view according to the updated IO view, and process, according to the updated locally-stored IO view, replication of the data corresponding to the IO request.

5. The distributed storage system according to claim 4, wherein
the metadata controller is further configured to notify the executing IO router of the updated IO view; and
the executing IO router is configured to store an IO view and to update the IO view locally stored thereon, and processes forwarding of the IO request according to the updated locally-stored IO view.

6. The distributed storage system according to claim 4, wherein the updating a partition view of a partition group that comprises the partition on the faulty OSD node comprises:
when the partition on the faulty OSD node comprises a secondary partition, marking a partition status of the faulty OSD node in a partition view of a partition group that comprises the secondary partition as inconsistent; and
when the partition on the faulty OSD node comprises the primary partition, setting the faulty OSD node that serves as a primary OSD node in a partition view of the partition group that comprises the primary partition as a new secondary OSD node, marking a partition status corresponding to the new secondary OSD node as inconsistent, selecting a secondary OSD node whose partition status is consistent from an original secondary OSD node in the partition view of the partition group that comprises the primary partition, and setting the selected secondary OSD node as a new primary OSD node.

7. The distributed storage system according to claim 6, wherein
the metadata controller is configured to update the updated partition view and the updated TO view, send an updating notification to a primary OSD node in the further updated partition view, and send an updating notification to a secondary OSD node in the further updated partition view;
the primary OSD node in the updated partition view being configured to process, according to the further updated partition view, replication of the data corresponding to the IO request; and
the secondary OSD node in the updated partition view being configured to process, according to the further updated IO view, replication of the data corresponding to the IO request.

8. A method for managing data storage and replication in a distributed storage system, wherein the system comprises at least one metadata controller, multiple IO routers, and multiple object-based storage device (OSD) nodes, the metadata controller being configured to: configure, at least two partitions corresponding to physical storage resources managed by each OSD node, the at least two partition being a primary partition, a secondary partition, or any combination of primary and secondary partitions, primary and secondary partitions of a combination of partitions constituting a partition group, a primary partition and a secondary partition in a same partition group being located on different OSD nodes, an OSD node on which a primary partition is located being a primary OSD node of a partition group that comprises the primary partition, and an OSD node on which a secondary partition is located being a secondary OSD node of a partition group that comprises the secondary partition, generating a partition view according to the partition, wherein the partition view comprises information about an OSD node on which a partition in a partition group is located, the IO router being configured to route a received IO request to an OSD node, the OSD node being configured to execute, according to the IO request, storage of data corresponding to the IO request, the method comprising:

sending the partition view only to the a primary OSD node on which a partition in the partition view is located to update a local partition view; and determining, by the metadata controller, existence of a faulty OSD node that is not capable of providing an IO service;

determining, by the metadata controller, a partition on the faulty OSD node upon the determination of the existence of the faulty OSD node;

updating, by the metadata controller, a partition view of a partition group that comprises the partition on the faulty OSD node, and sending an updating notification to a primary OSD node in the updated partition view; and processing, by the primary OSD node, according to the updated partition view after receiving the updating notification sent by the metadata controller, replication of the data corresponding to the IO request.

9. The method according to claim 8, wherein the partition view comprises a primary and secondary identity and a corresponding partition status that are of an OSD node on which a partition in a partition group is located, the method further comprising updating, by the primary OSD node, according to the updated partition view, a partition view locally stored on the primary OSD node; and the processing, according to the updated partition view, replication of the data corresponding to the IO request comprises:

replicating, according to the updated locally-stored partition view, the data corresponding to the IO request from the IO router onto a secondary OSD node whose partition status is consistent in the updated locally-stored partition view, or onto a secondary OSD node whose partition status is consistent in the updated locally-stored partition view and a secondary OSD node whose partition status is inconsistent in the updated locally-stored partition view but that is recovering data.

10. The method according to claim 8, wherein the method further comprises:

when determining that the partition on the faulty OSD node comprises a primary partition, updating, by the metadata controller, an IO view of a partition group that comprises the primary partition, and notifying a secondary OSD node in the updated partition view of the updated IO view; and updating, by the secondary OSD node in the updated partition view, a locally stored IO view according to the updated IO view, and processing, according to the updated locally-stored IO view, replication of the data corresponding to the IO request.

11. The method according to claim 10, wherein the updating a partition view of a partition group that comprises the partition on the faulty OSD node comprises:

when the partition on the faulty OSD node comprises a secondary partition, marking a partition status of the faulty OSD node in a partition view of a partition group that comprises the secondary partition as inconsistent; and when the partition on the faulty OSD node comprises the primary partition, setting the faulty OSD node that serves as a primary OSD node in a partition view of the partition group that comprises the primary partition as a new secondary OSD node, marking a partition status corresponding to the new secondary OSD node as inconsistent, selecting a secondary OSD node whose partition status is consistent from an original secondary OSD node in the partition view of the partition group that comprises the primary partition, and setting the selected secondary OSD node as a new primary OSD node.

12. The method according to claim 11, wherein the method further comprises:

after the faulty OSD node completes failback and data recovery, further updating, by the metadata controller, the updated partition view and the updated IO view, sending an updating notification to a primary OSD node in the further updated partition view, and sending an updating notification to a secondary OSD node in the further updated partition view;

processing, by the primary OSD node in the further updated partition view according to the further updated partition view, replication of the data corresponding to the IO request; and processing, by the secondary OSD node in the further updated partition view according to the further updated IO view, replication of the data corresponding to the IO request.

* * * * *

UNITED STATES PATENT AND TRADEMARK OFFICE
CERTIFICATE OF CORRECTION

PATENT NO. : 10,713,134 B2
APPLICATION NO. : 15/589856
DATED : July 14, 2020
INVENTOR(S) : Wang et al.

Page 1 of 1

It is certified that error appears in the above-identified patent and that said Letters Patent is hereby corrected as shown below:

In the Claims

Claim 7, Column 44, Line 33: "updated TO view" should read -- updated IO view --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*